United States Patent
Vakili et al.

(10) Patent No.: US 12,470,655 B1
(45) Date of Patent: Nov. 11, 2025

(54) SYSTEM FOR PROCESSING TELEPHONE VOICE DATA TO DRIVE AN APPLICATION PROTOCOL

(71) Applicant: UpDoc Inc., Los Altos, CA (US)

(72) Inventors: Sharif Vakili, Los Altos, CA (US); Ashwin K. Nayak, Mountain View, CA (US)

(73) Assignee: UpDoc Inc., Los Altos, CA (US)

( * ) Notice: Subject to any disclaimer, the term of this patent is extended or adjusted under 35 U.S.C. 154(b) by 0 days.

(21) Appl. No.: 18/891,704

(22) Filed: Sep. 20, 2024

(51) Int. Cl.
*H04M 3/493* (2006.01)

(52) U.S. Cl.
CPC .................. *H04M 3/4936* (2013.01)

(58) Field of Classification Search
None
See application file for complete search history.

(56) References Cited

U.S. PATENT DOCUMENTS

| | | | |
|---|---|---|---|
| 8,116,445 B2 | 2/2012 | Odinak et al. | |
| 9,697,057 B2 | 7/2017 | Allen et al. | |
| 11,031,013 B1 | 6/2021 | Myers et al. | |
| 11,176,942 B2 | 11/2021 | Di Fabbrizio et al. | |
| 11,176,945 B2 | 11/2021 | Paul et al. | |
| 11,301,908 B2 | 4/2022 | Batcha et al. | |
| 11,303,750 B2 | 4/2022 | Chavez et al. | |
| 11,363,140 B2 | 6/2022 | Agarwal et al. | |
| 11,456,887 B1 | 9/2022 | McCracken et al. | |
| 11,663,250 B2 | 5/2023 | Raju | |
| 11,676,574 B2 | 6/2023 | Rakshit et al. | |
| 11,743,378 B1 | 8/2023 | Johnston et al. | |
| 11,804,211 B2 | 10/2023 | Aharoni et al. | |
| 11,956,187 B2 | 4/2024 | Hackman et al. | |
| 12,008,994 B2 | 6/2024 | De et al. | |
| 12,020,690 B1 | 6/2024 | Gamzu et al. | |
| 2006/0206310 A1 | 9/2006 | Ravikumar et al. | |
| 2012/0041775 A1* | 2/2012 | Cosentino | G16H 20/17 705/2 |
| 2013/0179178 A1* | 7/2013 | Vemireddy | G06Q 10/00 705/2 |
| 2017/0213001 A1* | 7/2017 | Harrison | G16H 40/63 |
| 2019/0362319 A1 | 11/2019 | Yen | |
| 2022/0051661 A1 | 2/2022 | Park et al. | |
| 2022/0199079 A1 | 6/2022 | Hanson et al. | |
| 2023/0026945 A1 | 1/2023 | Friedlander et al. | |
| 2024/0048649 A1 | 2/2024 | Vaananen | |

* cited by examiner

*Primary Examiner* — Hemant S Patel
(74) *Attorney, Agent, or Firm* — Gregory Finch; Finch Paolino, LLC

(57) ABSTRACT

An interactive voice response (IVR) system for processing telephone voice data. Certain aspects of the present disclosure provide for an IVR system that is operably engaged with at least one application engine. The application engine may comprise at least one configurable protocol comprising one or more parameters that may be configured by at least one user. The IVR system may be configured to execute one or more bi-directional voice call with at least one end user to derive voice response data corresponding to variables associated with the one or more parameters. The IVR system may be configured to process the voice response data and provide the voice response data as a formatted data input to the application engine to drive one or more operations for the at least configurable protocol and/or configure, update or modify one or more graphical user interface of an end user application.

20 Claims, 13 Drawing Sheets

SYSTEM FOR PROCESSING TELEPHONE VOICE DATA TO DRIVE AN APPLICATION PROTOCOL

FIELD

The present disclosure relates to the field of interactive voice response systems in telephone networks; in particular, a system for processing telephone voice data to configure one or more graphical user interface elements and application protocols of a software application.

BACKGROUND

Interactive voice response (IVR) is a technology that allows telephone users to interact with a computer-operated telephone system through the use of voice and dual-tone multi-frequency (DTMF) tones input with a keypad. In telephony, IVR allows users to interact with a host system via a telephone keypad or by speech recognition, after which services can be inquired about through the IVR dialogue and/or data may be received by the IVR system in response to user input; for example, credit card data for the purpose of making a payment over the phone. IVR systems can respond with pre-recorded or dynamically generated audio to further direct users on how to proceed according to one or more dynamic or pre-configured interaction sequences.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a system comprising one or more processors and at least one non-transitory computer-readable memory device in communication with the one or more processors and having processor-executable instructions stored thereon that, when executed by the one or more processors, is configured to cause the one or more processors to execute one or more operations for processing telephone voice data to modify or configure a graphical user interface and/or drive one or more operations of an application protocol. In accordance with certain aspects of the present disclosure, the one or more operations may comprise operations for providing a first instance of an end user application comprising a user interface to a client device associated with a first end user. In certain embodiments, the user interface comprises one or more graphical elements configured according to one or more parameters of an application protocol for the end user application. In said embodiments, the application protocol may comprise one or more task or interaction sequence for the first end user. The one or more operations may further comprise operations for establishing, via a telephony network, a bi-directional voice call between an interactive voice response agent and the client device. The one or more operations may further comprise operations for generating, via the interactive voice response agent, at least one conversational prompt comprising a natural language audio output over the bi-directional voice call. In certain embodiments, the at least one conversational prompt is configured according to the one or more task or interaction sequence for the first end user. The one or more operations may further comprise operations for receiving, via the bi-directional voice call, at least one voice utterance from the first end user in response to the at least one conversational prompt (e.g., wherein the at least one voice utterance is received via a receiver of the client device). The one or more operations may further comprise operations for processing the at least one voice utterance according to a natural language processing engine to generate at least one dataset comprising the telephone voice data. The one or more operations may further comprise operations for processing the telephone voice data to extract one or more variables associated with the one or more parameters of the application protocol. The one or more operations may further comprise operations for updating a state of the application protocol according to the one or more variables extracted from the telephone voice data. In accordance with certain embodiments, the operations for updating the state of the application protocol may comprise one or more steps or operations for updating the one or more task or interaction sequence for the first end user. In certain embodiments, the one or more operations may further comprise operations for modifying the one or more graphical elements of the user interface in response to updating the state of the application protocol.

In accordance with certain aspects of the present disclosure, the one or more parameters of the application protocol may be configured according to one or more user-generated inputs. In certain embodiments, the one or more graphical elements are modified according to the one or more variables extracted from the telephone voice data. In certain embodiments, the one or more graphical elements are configured to provide a graphical visualization of one or more steps or operations of the application protocol. In said embodiments, the one or more graphical elements may be modified to display a stage or degree of progress for the one or more task or interaction sequence. In accordance with certain aspects of the present disclosure, the one or more operations may further comprise establishing, via the telephony network, a subsequent bi-directional voice call between the interactive voice response agent and the client device in response to updating the state of the application protocol according to the one or more variables extracted from the telephone voice data. In accordance with said aspects of the present disclosure, the one or more operations may further comprise generating, via the interactive voice response agent, at least one subsequent conversational prompt, wherein the at least one subsequent conversational prompt is configured according to the updated state of the application protocol.

Further aspects of the present disclosure provide for a system comprising one or more processors and at least one non-transitory computer-readable memory device in communication with the one or more processors and having processor-executable instructions stored thereon that, when executed by the one or more processors, is configured to cause the one or more processors to execute one or more operations for processing telephone voice data to modify or configure a graphical user interface and/or drive one or more operations of an application protocol. In accordance with certain embodiments, the one or more operations may comprise operations for receiving a first set of user-generated inputs from a first user (e.g., wherein the first set of user-generated inputs comprising one or more parameters for an application protocol of an end user application). The one or more operations may further comprise operations for configuring the application protocol according to the first set of user-generated inputs (e.g., wherein the application protocol comprises one or more task or interaction sequence for a second user). The one or more operations may further comprise operations for configuring at least one conversational prompt for an interactive voice response agent according to the one or more task or interaction sequence for the second user. The one or more operations may further comprise operations for establishing, via a telephony network, a bi-directional voice call between the interactive voice response agent and a telephone associated with the second user. The one or more operations may further comprise operations for generating, via the interactive voice response agent, a natural language audio output over the bi-directional voice call (e.g., wherein the natural language audio output comprising the at least one conversational prompt). The one or more operations may further comprise operations for receiving, via the bi-directional voice call, at least one voice utterance from the second user in response to the at least one conversational prompt. The one or more operations may further comprise operations for processing the at least one voice utterance according to a natural language processing engine to generate at least one dataset comprising the telephone voice data. The one or more operations may further comprise operations for processing the telephone voice data to extract one or more variables associated with the one or more parameters for the application protocol of the end user application. The one or more operations may further comprise operations for updating a state of the application protocol according to the one or more variables extracted from the telephone voice data (e.g., wherein updating the state of the application protocol comprises updating the one or more task or interaction sequence for the second user).

In accordance with certain aspects of the present disclosure, the one or more operations may further comprise configuring a graphical user interface of the end user application according to the one or more parameters of the application protocol. In accordance with certain embodiments, the one or more operations may further comprise presenting an instance of the end user application to the second user via a client device. In accordance with said embodiments, the one or more operations may further comprise modifying one or more graphical elements of the graphical user interface in response to updating the state of the application protocol. In accordance with said embodiments, the one or more graphical elements may be modified according to the one or more variables extracted from the telephone voice data. In accordance with said embodiments, the one or more graphical elements may be configured to provide a graphical visualization of one or more steps or operations of the application protocol. In accordance with said embodiments, the one or more graphical elements may be modified to provide a graphical visualization of a stage or degree of progress for the one or more task or interaction sequence.

Still further aspects of the present disclosure provide for a system comprising one or more processors and at least one non-transitory computer-readable memory device in communication with the one or more processors and having processor-executable instructions stored thereon that, when executed by the one or more processors, is configured to cause the one or more processors to execute one or more operations for processing telephone voice data to modify or configure a graphical user interface and/or drive one or more operations of an application protocol. In accordance with certain embodiments, the one or more operations may comprise operations for configuring an application protocol for an end user application. In certain embodiments, the application protocol comprises one or more task or interaction sequence for an end user of the end user application. In certain embodiments, the end user application comprises a graphical user interface comprising one or more graphical elements configured to provide a visualization of the one or more task or interaction sequence for the end user. In accordance with certain embodiments, the one or more operations may comprise operations for configuring at least one conversational prompt for an interactive voice response agent according to the one or more task or interaction sequence for the end user. The one or more operations may comprise operations for establishing, via a telephony network, a bi-directional voice call between the interactive voice response agent and a telephone associated with the end user. The one or more operations may comprise operations for providing, via the bi-directional voice call, the at least one conversational prompt to the end user (e.g., wherein the at least one conversational prompt comprises a natural language audio output by the interactive voice response agent). The one or more operations may comprise operations for receiving, via the bi-directional voice call, at least one voice utterance from the end user in response to the at least one conversational prompt. The one or more operations may comprise operations for processing the at least one voice utterance according to a natural language processing engine to generate at least one dataset comprising the telephone voice data. The one or more operations may comprise operations for processing the telephone voice data to extract one or more variables associated with one or more parameters of the application protocol. The one or more operations may comprise operations for configuring or modifying the one or more graphical elements of the graphical user interface according to the one or more variables extracted from the telephone voice data.

In accordance with certain embodiments of the system, the one or more operations further comprise updating a state of the application protocol according to the one or more variables extracted from the telephone voice data. In said embodiments, the one or more operations for updating the state of the application protocol may comprise one or more steps or operations for updating the one or more task or interaction sequence for the end user. In certain embodiments, the one or more operations may further comprise providing an instance of the end user application to an end user device associated with the end user. In certain embodiments, the one or more graphical elements may be configured or modified to provide a graphical visualization of a stage or degree of progress for the one or more task or interaction sequence. In certain embodiments, the one or more operations may further comprise receiving a plurality of user-generated input data for configuring the application protocol for the end user application.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and its associated method processes may be better understood from the following illustrative description with reference to the following drawings in which.

DETAILED DESCRIPTION

Figure 1:
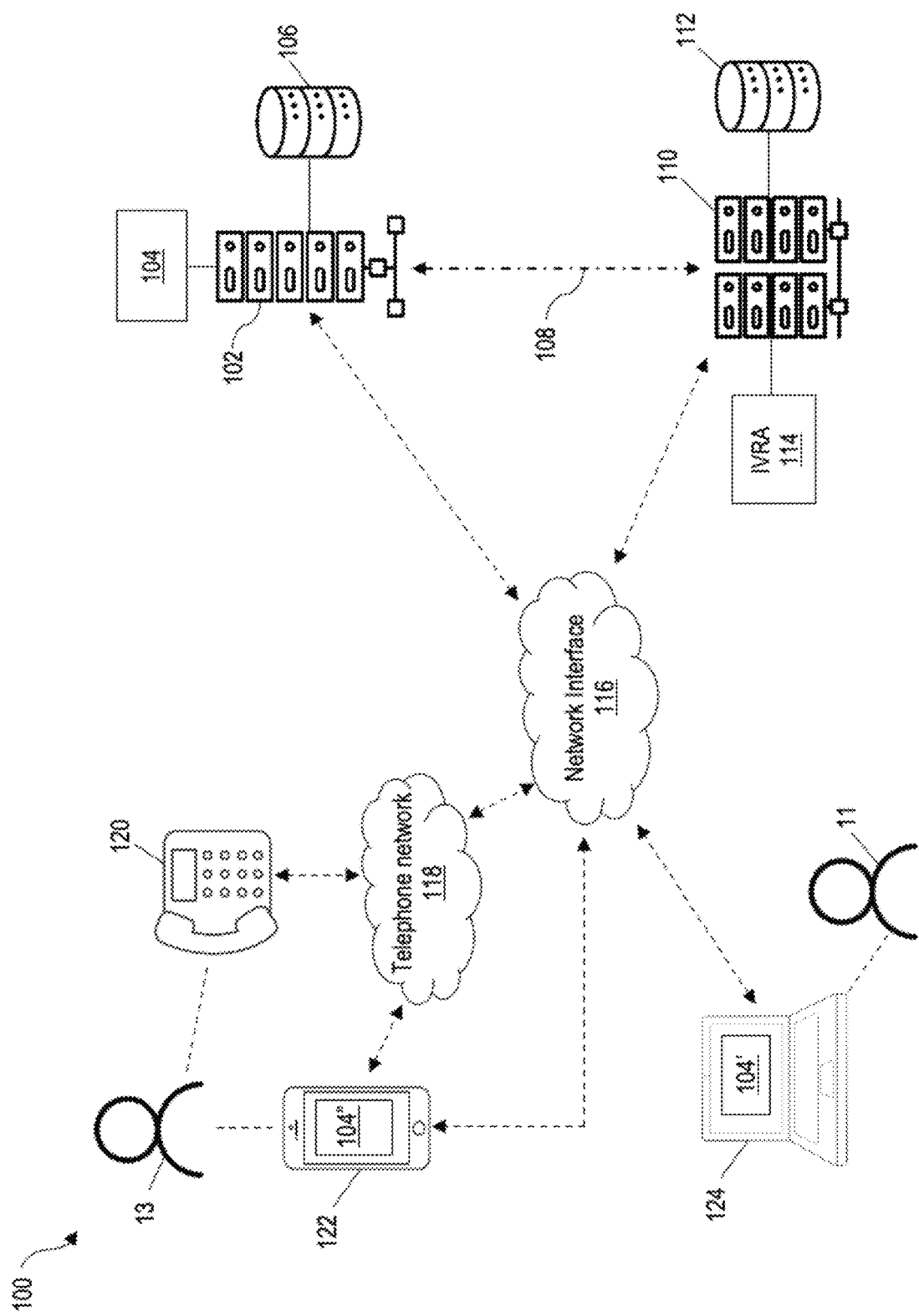
FIG. 1 is an architecture diagram of an interactive voice response system, in accordance with certain aspects of the present disclosure.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to an interactive voice response (IVR) system for processing telephone voice data to update or modify one or more graphical elements of a software application and/or drive one or more operations of an application protocol. Certain aspects of the present disclosure provide for an IVR system that is operably engaged with at least one application engine. The application engine may comprise at least one configurable protocol comprising one or more parameters that may be configured by at least one end user. The one or more parameters may correspond to one or more tasks or interaction sequences for at least one end user. The application engine may be communicably engaged with the IVR system to configure a conversational model according to the one or more parameters. The IVR system may be configured to execute one or more bi-directional voice call with at least one end user to derive voice response data corresponding to variables associated with the one or more parameters. The IVR system may be configured to process the voice response data and provide the voice response data as a formatted data input to the application engine. The application engine may be operably configured to process the formatted data input to drive one or more operations for the at least configurable protocol and/or configure, update or modify one or more graphical user interface of an end user application.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Before the present invention and specific exemplary embodiments of the invention are described, it is to be understood that this invention is not limited to the particular embodiments described, and as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, the terms "computer," "processor" and "computer processor" encompass a personal computer, a workstation computer, a tablet computer, a smart phone, a microcontroller, a microprocessor, a field programmable object array (FPOA), a digital signal processor (DSP), an application-specific integrated circuit (ASIC), a field programmable gate array (FPGA), a programmable logic array (PLA), or any other digital processing engine, device or equivalent capable of executing software code including related memory devices, transmission devices, pointing devices, input/output devices, displays and equivalents.

As used herein, the terms "conversational agent" or "conversational AI agent" or "agent" refer to any device, system and/or program configured to autonomously execute one or more objective function in response to one or more inputs. Said terms may be used interchangeably. The one or more inputs may comprise one or more user-generated inputs, sensor-based inputs, internal system inputs, external system inputs, environmental percepts, and the like. Examples of conversational agents may include, but are not limited to, one or more virtual assistant, personal assistant or chatbot.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

As used herein, the term "instance" means a case or occurrence of one or more executable operations of a software application including, but not limited to, a session, a graphical element, a document type, or a document that conforms to a particular data type definition.

As used herein, the term "mobile device" or "mobile electronic device" or "mobile computing device" includes any portable electronic device capable of executing one or more digital functions or operations; including, but not limited to, smart phones, tablet computers, personal digital assistants, wearable activity trackers, smart watches, smart speakers, and the like.

As used herein, a "portal" makes network resources (applications, databases, etc.) available to end users. The user can access the portal via a web browser, smart phone, tablet computer, and other client computing devices. Portals may include network enabling services such as e-mail, chat rooms and calendars that interact seamlessly with other applications.

As used herein, the term "transmit" and its conjugates means transmission of digital and/or analog signal information by electronic transmission, Wi-Fi, BLUETOOTH technology, wireless, wired, or other known transmission technologies including transmission to an Internet web site.

An exemplary system, method, and apparatus according to the principles herein may include an interactive voice response system comprising an application server and an IVR server that are communicably engaged to dynamically configure one or more multi-turn conversational interactions with at least one end user (e.g., via a telephony network) to drive one or more application protocol and/or modify one or more graphical user interface element based on telephone voice data received from the at least one end user.

In accordance with an exemplary use case provided by embodiments of the present disclosure, an interactive voice response system may be configured in accordance with one or more user-inputs comprising parameters for configuring an application protocol of a software application. The application protocol may comprise one or more rules or operations for driving at least one remote intervention protocol for at least one end user (e.g., via the software application). The remote intervention protocol may include, for example, a task, a sequence of interactions, an instruction, a prompt, and the like. In an exemplary use case, the interactive voice response system may be embodied as a medication management system for managing a dosage regimen for at least one medication. In accordance with said exemplary use case, the interactive voice response system may comprise at least one user interface for configuring a medication protocol for management of at least one indication; for example, a glycemic medication protocol for management of diabetes. In said use case, a first user (e.g., a doctor, nurse or other medical practitioner) may configure a plurality of parameters for the medication management protocol via the at least one user interface. The interactive voice response system may be configured to process the user-generated inputs received at the user interface to configure at least one protocol for medication management. In accordance with certain aspects of the present disclosure, the at least one protocol may comprise a muti-phase or a multi-stage protocol comprising one or more phase or stage. One or more phase or stage of the at least one protocol may be data-driven; for example, a first phase of the protocol may be implemented in response to a first range of fasting blood glucose values for a specified time period and a second phase of the protocol may be implemented in response to a second range of fasting blood glucose values for the specified time period. In accordance with certain aspects of the present disclosure, the at least one protocol comprises one or more tasks or interaction sequences for at least one end user. For example, a task may comprise an instruction to take a specified dose of a medication at a specified time and an interaction sequence may comprise at least one interaction with the interactive voice response system, such as providing medication log data or blood glucose data in response to at least one system prompt. In accordance with certain aspects of the present disclosure, the interactive voice response system may be configured to configure a conversational model according to the at least one task or interaction sequence for the at least one protocol. The conversational model may be configured to output one or more natural language prompts via an interactive voice response agent (e.g., via a telephone voice call) to the at least one end user to elicit one or more voice responses from the end user (e.g., via the telephone voice call). The interactive voice response system may be configured to process the one or more voice responses from the end user (e.g., according to an IVR model) and provide a formatted data input to an application engine. The application engine may be configured to process the formatted data input to drive one or more operations for the application protocol (e.g., process a task as complete) and/or update, configure or modify one or more elements of a graphical user interface for the software application.

Certain benefits and advantages of the present disclosure include an interactive voice response system that is configured to receive and process telephone voice data from at least one user to drive one or more operations of an application protocol of a software application and/or update, configure or modify one or more elements of a graphical user interface for the software application.

Certain benefits and advantages of the present disclosure include an interactive voice response system that is configured to process out-of-session data for a software application to drive one or more in-session operations or functions for the software application. In accordance with certain aspects of the present disclosure, the out-of-session data comprises telephone voice data received via at least one bi-directional telephone voice call between an IVR agent and an end user of the software application.

Certain benefits and advantages of the present disclosure include a remote user intervention system configured to enable an administrator user to configure an intervention protocol for an end user (e.g., via a graphical user interface) and implement a remote intervention for the end user via an application server and an interactive voice response sub-system. In accordance with certain aspects of the present disclosure, the interactive voice response sub-system may comprise an interactive voice response agent configured to establish a bi-directional telephone call with the end user and provide natural language prompts to the end user (e.g., via the bi-directional telephone call). In accordance with certain aspects of the present disclosure, the remote user intervention system is configured to process voice responses received from the end user (e.g., via the bi-directional telephone call) according to one or more parameters of the intervention protocol. In accordance with certain aspects of the present disclosure, the remote user intervention system is configured to drive one or more operations of the intervention protocol and configure one or more application interface in response to processing the voice responses received from the end user.

Turning now descriptively to the drawings, in which similar reference characters denote similar elements throughout the several views, FIG. 1 depicts an architecture diagram of an interactive voice response system 100 through which certain illustrated embodiments of the present disclosure may be implemented. In accordance with certain aspects of the present disclosure, system 100 is configured to received and process telephone voice data to configure one or more graphical user interface elements and/or protocols of a software application. In accordance with certain illustrated embodiments, system 100 may comprise an application server 102 communicably engaged with an application database 106. Application server 102 may comprise a software application 104 hosted thereon. Software application 104 may comprise a mobile and/or web-based software application comprising one or more configurable protocol configured to drive one or more tasks or interaction sequences for one or more end user. In accordance with certain aspects of the present disclosure, software application 104 may comprise a remote intervention application, wherein the one or more tasks or interaction sequences for the one or more end user comprise an intervention for the end user to direct the end user's progress toward a desired outcome. In accordance with certain aspects of the present disclosure, the one or more configurable protocol may comprise a plurality of operations for presenting the one or more tasks or interaction sequences to the one or more end user via one or more configurable graphical user interfaces. The one or more tasks or interaction sequences may be configured according to a variety of commercial use cases including, for example, educational curriculum, personal finance and wealth management, job/skills training, learning management systems, wedding planning, compliance management (e.g., financial and regulatory), event planning, fitness management, diet/nutrition management, project management, health coaching, medication management, care management, and wound care management.

In accordance with certain aspects of the present disclosure, system 100 may further comprise an interactive voice response (IVR) server 110 and an IVR database communicably engaged with IVR server 110. IVR server 110 may comprise a cloud-based IVR system server communicably engaged with a communications network interface 116. Communications network interface 116 may comprise an Internet, a cellular network, a local area network (LAN), a wide area network (WAN), and/or other network communication interfaces. IVR server 110 may be configured to execute telephone calls over a telephone network 118 including, for example, a voice over Internet-protocol (VOIP) network (i.e., telephony network), cellular telephone network, and/or a public switched telephone network (PTSN). IVR server 110 may comprise an IVR agent 114 comprising a text-to-speech (TTS) engine configured to provide a natural language audio output of complex and dynamic information according to an IVR dialogue module. IVR agent 114 may further comprise a speech-to-text (STT) engine configured to process voice utterances from a telephone caller as inputs to the IVR dialogue module. IVR server 110 may be communicably engaged with application server 102 via an application programming interface (API) 108. API 108 may enable a bi-directional data transfer interface between application server 102 and IVR server 110 to enable the remote execution of one or more operations between application server 102 and IVR server 110 and the transfer of data between application database 106 and IVR database 112 (e.g., in response to one or more API calls). In certain alternative embodiments, IVR agent 114 may reside on application server 102 and the operations for IVR server 110 may be executed on application server 102. In accordance with said embodiments, system 100 may be optionally configured wherein the operations of IVR server 110 are executed on application server 102 (i.e., IVR server 110 is eliminated).

In accordance with certain aspects of the present disclosure, system 100 may further comprise an admin user client 124 communicably engaged with application server 102 via network interface 116. Admin user client 124 may comprise a computer workstation, such as a laptop computer, desktop computer, mobile computing device, smartphone, and the like. System 100 may also comprise an end user client 122 communicably engaged with application server 102 via network interface 116. End user client 122 may comprise a mobile computing device, such as a smart phone. System 100 may optionally comprise a telephone 120. In certain embodiments, telephone 120 may comprise a cellular telephone or a landline telephone comprising a receiver. In certain embodiments, system 100 may comprise only end user client 122 (i.e., telephone 120 is eliminated). In other embodiments, system 100 may comprise only telephone 120 (i.e., end user client 122 is eliminated). In accordance with certain aspects of the present disclosure, end user client 122 and/or telephone 120 may be communicably engaged with IVR server 110 (e.g., via IVR agent 114) via telephone network 118.

In accordance with certain aspects of the present disclosure, application server 102 may be configured to provide an admin user instance 104' of software application 104 at admin user client 124 and provide an end user instance 104" of software application 104 at end user client 122. Admin user instance 104' may comprise a graphical user interface comprising a plurality of graphical elements configured to enable an admin user 11 to configure one or more protocols of software application 104. In certain embodiments, admin user 11 may configure the one or more protocols via the graphical user interface of admin user instance 104'. In other embodiments, admin user 11 may configure the one or more protocols via a voice-based conversational interface of admin user instance 104'. In said embodiments, admin user instance 104' may comprise a conversational agent interface (i.e., chat bot) configured to present one or more prompts (i.e., natural language voice prompts) associated with one or more protocol parameters to admin user 11 and receive one or more responses (i.e., voice responses) to the one or more prompts from admin user 11 via a microphone of admin user client 124. Software application 104 may be configured to process the one or more voice responses from admin user 11 according to at least one natural language processing model to extract key variables from the responses and configure the one or more protocols (i.e., intervention protocol) according to the responses. In accordance with certain embodiments, the one or more protocols are associated with at least one remote intervention for an end user 13. The one or more protocols may comprise parameters for one or more tasks or interaction sequences for software application 104. In accordance with certain use cases, admin user 11 may be a user who configures one or more tasks or interaction sequences for an end user 13. For example, in an exemplary use case wherein software application 104 is configured as a remote intervention application, admin user 11 may comprise a user role for a coach, a doctor, a teacher, a trainer, a nurse, a caregiver, or other user persona that might provide an intervention to an end user. In an exemplary use case wherein software application 104 comprises an application for medication management, for example, admin user instance 104' may be configured to enable admin user 11 to configure one or more protocols for a medication dosing regimen for management of one or more conditions or diseases. For example, the parameters for the one or more protocols may comprise parameters for medication selection, current dosage, dosage sequence, titration period, starting dose, maximum dose, and the like. In accordance with certain aspects of the present disclosure, the user-generated inputs received at admin user instance 104' may be communicated to application server 102 (e.g., via the communications interface/protocol between admin client 124 and application server 102). In accordance with certain aspects of the present disclosure, application server 102 may be configured to process the user-generated inputs to configure one or more protocols of software application 104 and store the user-generated inputs and configurations at application database 106. Application server 102 may be further configured to configure a graphical user interface for end user instance 104" of software application 104. End user client 122 may be configured to present end user instance 104" of software application 104 to end user 13 via a display of end user client 122. End user instance 104" may be configured to present the one or more tasks or interaction sequences to end user 13 and receive one or more user-generated inputs from end user 13 in response to the one or more tasks or interaction sequences.

In accordance with certain aspects of the present disclosure, application server 102 may be configured to configure a conversational artificial intelligence (AI) model for software application 104 based on the parameters for the one or more configured protocols and the one or more tasks or interaction sequences. The conversational AI model may comprise one or more engineered prompts configured to elicit one or more conversational responses from end user 13 (e.g., via a conversational chat interface or one or more voice-based interface). In accordance with certain embodiments, application server 102 may provide the one or more engineered prompts and/or one or more parameters for the application protocol to IVR server 110 via API 108. IVR server 110 may process the one or more engineered prompts and/or the one or more parameters for the application protocol to configure a conversational model for IVR agent 114. IVR server 110 may further process the one or more engineered prompts and/or the one or more parameters for the application protocol to configure one or more sequences for initiating a bi-directional voice call with end user 13 (e.g., via a telephone connection with telephone 120). In accordance with certain aspects of the present disclosure, IVR server 112 may initiate the bi-directional voice call between IVR agent 114 and end user 13 (e.g., via telephone 120 or end user client 122) in response to one or more scheduled phone interactions or API calls from application server 102 to IVR server 110. In accordance with certain aspects of the present disclosure, end user 13 may establish a session with IVR agent 114 by answering a phone call at telephone 120. Alternatively, end user 13 may establish a session with IVR agent 114 by making a phone call from telephone 120 to a telephone number associated with IVR agent 114. Once the bi-directional phone call between end user 13 and IVR agent 114 has been established, IVR agent 114 is configured to provide one or more engineered prompts to end user 13 (e.g., as one or more natural language voice outputs). In accordance with certain aspects of the present disclosure, end user 13 may provide one or more natural language voice responses at telephone 120 in response to the prompts. In certain embodiments, end user 13 may also be able to input one or more dual-tone multi-frequency signaling (DTMF) inputs via a keypad of telephone 120 in response to the prompts. In certain embodiments, IVR agent 114 is configured to process telephone voice data comprising one or more voice utterances received from end user 13 (e.g., via to a speech-to-text engine). IVR server 110 may be configured to format the telephone voice data according to at least one data transfer protocol and communicate the telephone voice data to application server 102 via API 108.

In accordance with certain aspects of the present disclosure, application server 102 is configured to process the telephone voice data as an input at software application 104. In accordance with certain aspects of the present disclosure, software application 104 is configured to process the telephone voice data according to the one or more tasks or interaction sequences of the application protocol to update a degree of progress/completion for the one or more tasks or interaction sequences for the application protocol and/or update a state of the application protocol. In accordance with certain aspects of the present disclosure, software application 104 is configured to modify or configure one or more graphical elements of the graphical user interface for end-user instance 104" and/or admin instance 104' in response to the updated degree of progress/completion for the one or more tasks or interaction sequences for the application protocol and/or the updated state of the application protocol. Software application 104 may be further configured to modify, update or configure one or more subsequent tasks or interaction sequences in response to processing the telephone voice data. Software application 104 may be further configured to modify or update one or more parameters of the conversational AI model in response processing the telephone voice data. Software application 104 may be further configured to execute one or more communications protocols in response processing the telephone voice data including, for example, sending one or more notifications (e.g., text message or push notification) to end user client 122 and/or admin client 124 in response to processing the telephone voice data.

Figure 2:
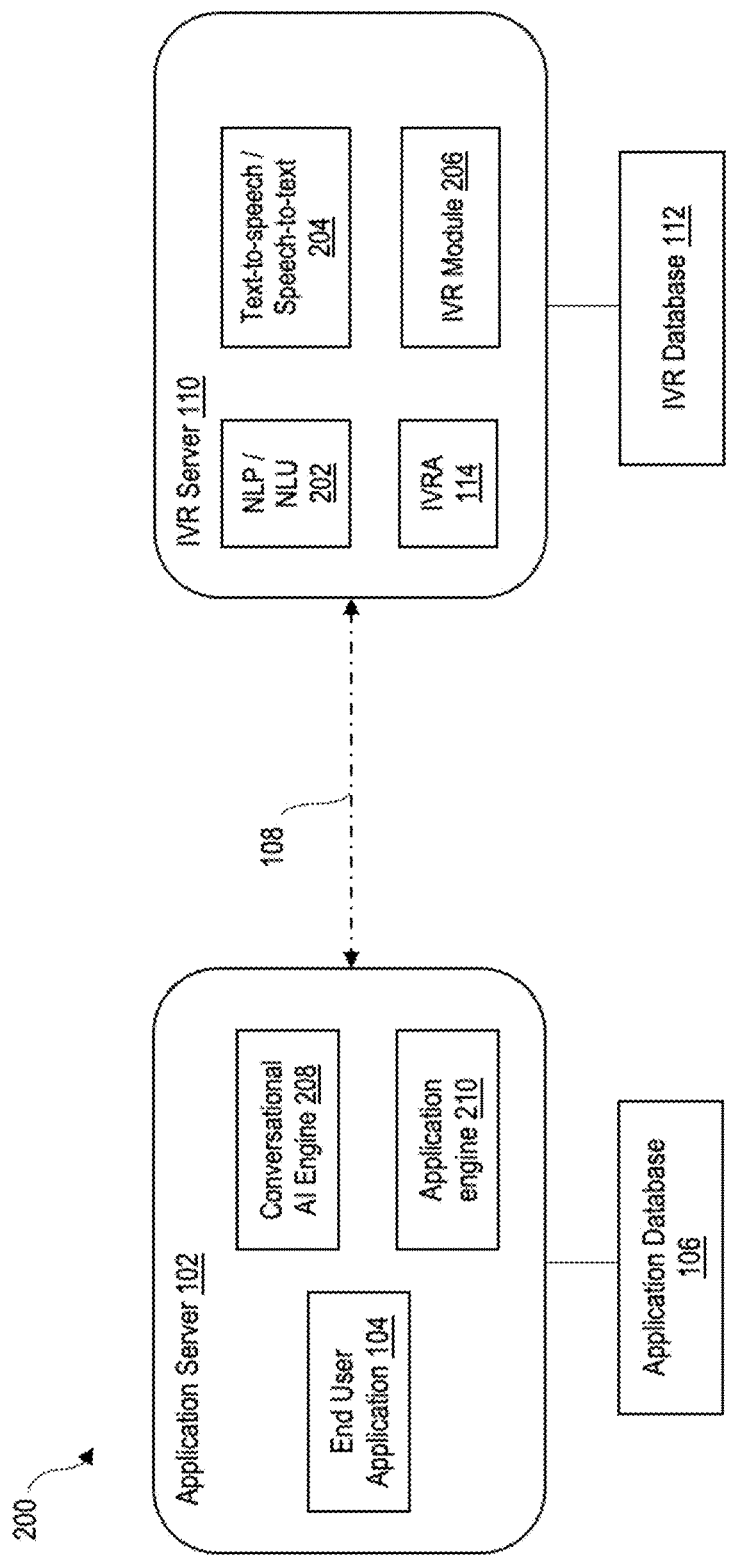
FIG. 2 is a system diagram of the interactive voice response system, in accordance with certain aspects of the present disclosure.

FIG. 2 is a system diagram 200 showing application server 102 and IVR server 110 in further detail. As also shown in FIG. 1, application server 102 is communicably engaged with application database 106 and IVR server 110 is communicably engaged with IVR database 112. Application server 102 is communicably engaged with IVR server via API 108. In accordance with certain aspects of the present disclosure, application server 102 comprises end user application 104 (e.g., as described in FIG. 1) hosted locally at application server 102. In certain embodiments, application server 102 may further comprise one or more software modules comprising a conversational AI engine 208 and an application engine 210. Conversational AI engine 208 may comprise an artificial intelligence processing framework configured to enable general-purpose language generation and/or other natural language processing tasks such as classification. In accordance with certain embodiments, the artificial intelligence processing framework may comprise an artificial neural network. In certain embodiments, the artificial neural network may comprise a transformer architecture, such as a decoder-only transformer-based architecture. In certain embodiments, conversational AI engine 208 may comprise a generative AI model including, but not limited to, a large language model (LLM). The architectures and frameworks behind generative AI models and LLMs are well known in the art and need not be discussed at length here for the purpose of brevity. In accordance with certain aspects of the present disclosure, application engine 210 may comprise a plurality of encoded operations for executing one or more data processing functions of end user application 104. The plurality of encoded operations may include, for example, operations for processing user-generated inputs received from the admin user; configuring one or more application protocols based on the user-generated inputs received from the admin user; configuring one or more parameters for the one or more application protocols based on the user-generated inputs received from the admin user; configuring one or more tasks or interactions sequences for the end user based on the one or more application protocols; configuring one or more graphical user interface elements for end user application 104; processing telephone voice data received from IVR server 110; updating, modifying or configuring one or more graphical user interface elements based on the telephone voice data received from IVR server 110; updating a phase or state of the one or more application protocols based on the telephone voice data received from IVR server 110; processing one or more user-generated input received by the end user; and sending one or more notifications or communications to one or more client devices.

In accordance with certain aspects of the present disclosure, IVR server 110 may comprise IVR agent 114 (e.g., as described in FIG. 1), a natural language processing/natural language understanding (NLP/NLU) module 202, a text-to-speech/speech-to-text engine 204, and an IVR module 206. IVR module 206 may comprise a conversational model configured according to one or more engineered prompts and/or conversational parameters received from conversational AI engine 208 and/or application engine 210. In accordance with certain aspects of the present disclosure, the one or more engineered prompts and/or conversational parameters are configured according to the application protocol. In accordance with certain embodiments, IVR module 206 functions as a proxy for conversational AI engine 208 at IVR server 110 via a real-time data transfer interface between IVR server 110 and application server 102. IVR module 206 is configured to provide one or more conversational prompts to IVR agent 114 according to the conversational module. In accordance with certain embodiments, IVR module 206 and/or IVR agent 114 is operably engaged with NLP/NLU module 202 to execute a natural language generation function to generate a machine voice output comprising a natural language translation of the one or more conversational prompts. In certain embodiments, IVR agent 114 is operably engaged with text-to-speech/speech-to-text engine 204 to convert the one or more conversational prompts from a text format to a speech format. In accordance with certain embodiments, text-to-speech/speech-to-text engine 204 may further comprise a voice-to-voice engine. The voice-to-voice engine may comprise a speech engine comprising an AI framework comprising algorithms and deep learning techniques configured to recognize and interpret voice utterances from the end user (e.g., via the bi-directional telephone voice call). According to certain aspects of the present disclosure, the voice-to-voice engine may reduce latency compared to a text-to-speech/speech-to-text engine. In accordance with certain embodiments, NLP/NLU module 202 is configured to process one or more voice inputs (i.e., voice utterances from the end user) received via IVR agent 114 (e.g., via the bi-directional telephone voice call) and process the voice inputs (i.e., telephone voice data) to provide a natural language understanding input to text-to-speech/speech-to-text engine 204. Text-to-speech/speech-to-text engine 204 may be operably engaged with IVR module 206 to format the telephone voice data to IVR module 206 in a specified format (i.e., a text format). In accordance with certain aspects of the present disclosure, IVR module 206 is configured to process the telephone voice data to drive one or more additional/multi-turn conversational interactions between IVR agent 114 and the end user. IVR module 206 may be further configured to communicate the telephone voice data to application server 102 via API 108 according to one or more data transfer protocols (e.g., via API 108).

Figure 3:
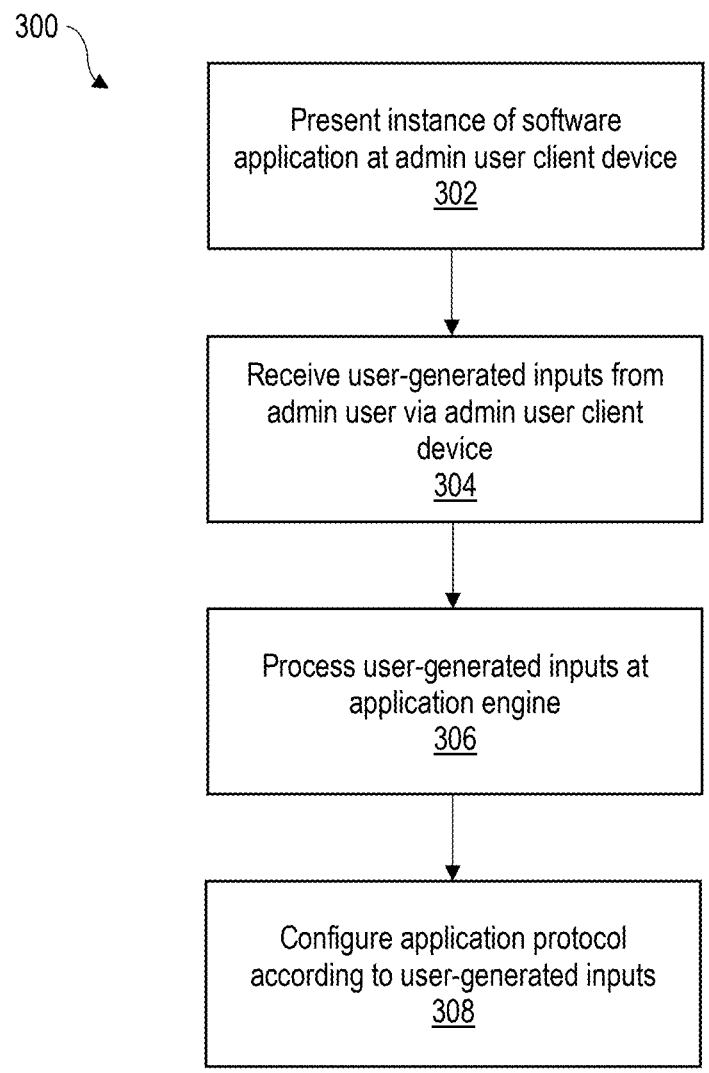
FIG. 3 is a process flow diagram of a routine for the interactive voice response system, in accordance with certain aspects of the present disclosure.

Referring now to FIG. 3, a process flow diagram of a routine 300 for an interactive voice response system (e.g., system 100 as shown in FIG. 1) is shown. The operations in routine 300 may be performed in the order presented, in a different order, or simultaneously. Further, in some exemplary embodiments, some of the operations may be omitted, added, modified, skipped, or the like without departing from the scope of the invention. In accordance with certain aspects of the present disclosure, routine 300 may comprise one or more operations 302-308 for configuring an application protocol according to one or more user-generated inputs by an admin user (e.g., admin user 11 as described in FIG. 1).

In accordance with certain aspects of the present disclosure, routine 300 may comprise one or more steps or operations for presenting an admin user instance (e.g., admin instance 104') of a software application (e.g., software application 104 as described in FIG. 1) to an admin user client device (Step 302). The admin user instance of the software application may comprise a graphical user interface comprising a plurality of graphical elements configured to enable the admin user to configure at least one application protocol for the software application. The plurality of graphical elements may comprise form elements for configuring one or more parameters of the at least one protocol. Routine 300 may further comprise one or more steps or operations for receiving a plurality of user-generated inputs from the admin user via the admin user client device (Step 304). The plurality of user-generated inputs from the admin user are received via the graphical user interface of the admin user instance and communicated to the application server (e.g., application server 102 as shown in FIG. 1) via at least one data transfer protocol (e.g., HTTP, etc.). Routine 300 may further comprise one or more steps or operations for processing the plurality of user-generated inputs at an application engine (e.g., application engine 210 as shown in FIG. 2) executing on the application server (Step 306). Routine 300 may further comprise one or more steps or operations for configuring one or more application protocol at the application engine according to the plurality of user-generated inputs (Step 308). In accordance with certain aspects of the present disclosure, the one or more application protocol may comprise one or more tasks or interactions sequences for an end user to complete/execute within the context of the software application.

Figure 4:
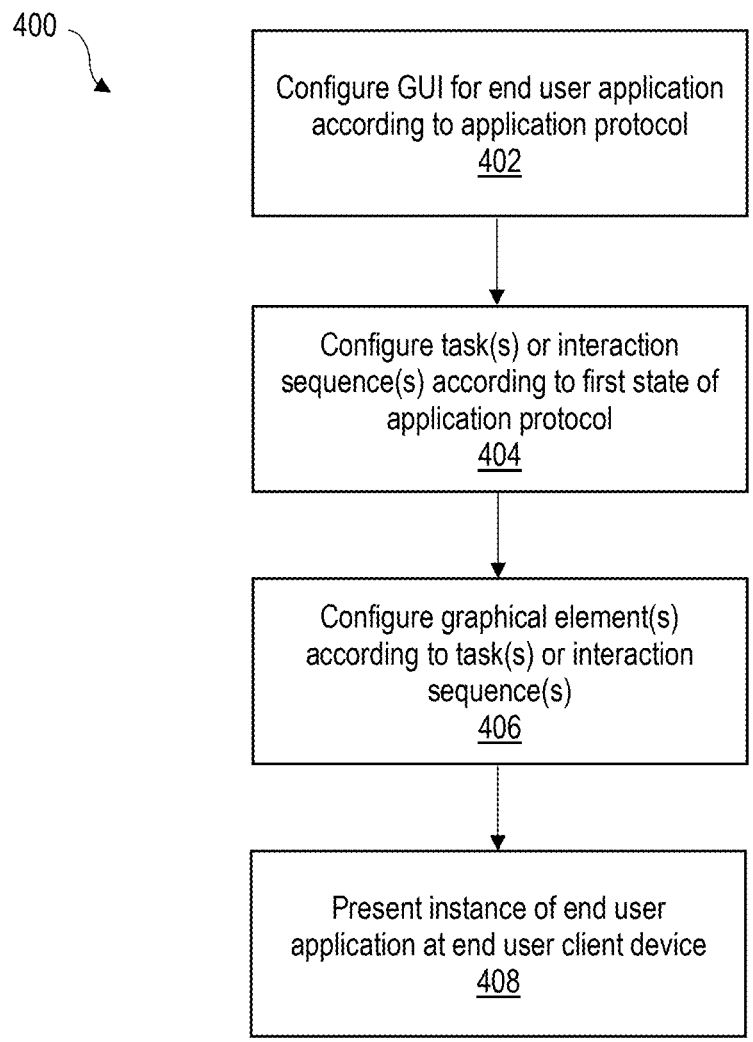
FIG. 4 is a process flow diagram of a routine for the interactive voice response system, in accordance with certain aspects of the present disclosure.

Referring now to FIG. 4, a process flow diagram of a routine 400 for an interactive voice response system (e.g., system 100 as shown in FIG. 1) is show. The operations in routine 400 may be performed in the order presented, in a different order, or simultaneously. Further, in some exemplary embodiments, some of the operations may be omitted, added, modified, skipped, or the like without departing from the scope of the invention. In certain embodiments, one or more steps or operations of routine 400 may be successive or sequential to one or more steps or operations of routine 300 (as shown in FIG. 3) and/or may comprise one or more sub-steps or sub-operations of routine 300. In accordance with certain aspects of the present disclosure, routine 400 may comprise one or more steps or operations 402-408 for configuring a graphical user interface of an end user application according to at least one application protocol.

In accordance with certain embodiments, routine 400 may comprise one or more steps or operations for configuring a graphical user interface (GUI) of an end user application (e.g., software application 104 of FIG. 1) according to at least one application protocol (Step 402). As described in the foregoing description, the at least one application protocol may be configured according to one or more user-generated inputs from an admin user. In accordance with certain aspects of the present disclosure, the at least one application protocol may comprise one or more states (i.e., phases). The one or more states may comprise one or more discrete sets of tasks or interaction sequences that may be configured according to one or more temporal or data-driven parameters. In accordance with certain aspects of the present disclosure, routine 400 may further comprise one or more steps or operations for configuring one or more tasks or interaction sequences of the end user application according to a first state of the at least one application protocol (Step 404). For example, an illustrative task or interaction sequence in the one or more tasks or interaction sequences may comprise a required action by the end user in the context of the end user application. Routine 400 may further comprise one or more steps or operations for configuring one or more graphical elements of the GUI of the end user application according to the one or more tasks or interaction sequences (Step 406). According to certain embodiments, the one or more graphical elements of the GUI may be configured to enable the end user to complete the one or more tasks and/or engage with the end user application according to the one or more interaction sequences. In certain embodiments, the one or more interaction sequences may comprise a conversational interaction via a text-based interface or a voice-based interface. In certain embodiments, the one or more interaction sequences may comprise a conversational interaction via a speech-to-text interface. In accordance with certain aspects of the present disclosure, routine 400 may comprise one or more steps or operations for presenting an instance of the end user application (e.g., end user instance 104' of FIG. 1) at a display of an end user client device (e.g., end user client 122 of FIG. 1) (Step 408).

Figure 5:
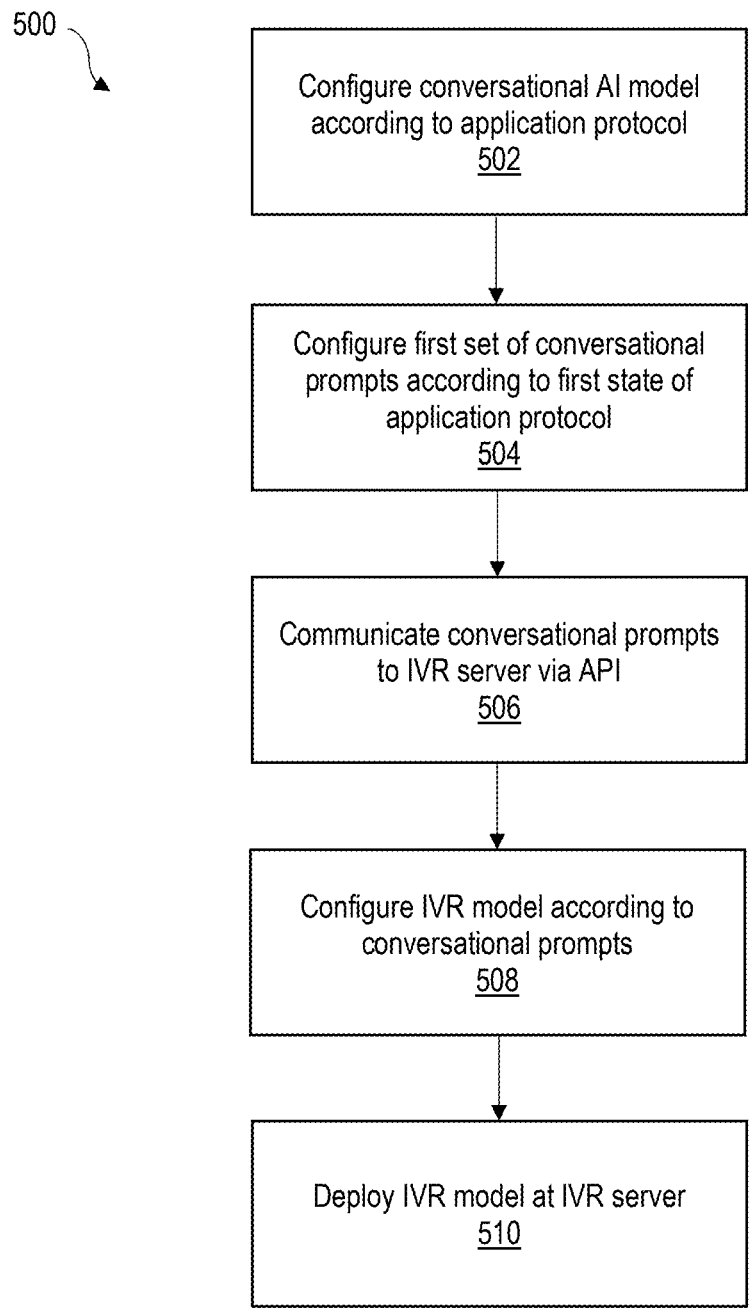
FIG. 5 is a process flow diagram of a routine for the interactive voice response system, in accordance with certain aspects of the present disclosure.

Referring now to FIG. 5, a process flow diagram of a routine 500 for an interactive voice response system (e.g., system 100 as shown in FIG. 1) is shown. The operations in routine 500 may be performed in the order presented, in a different order, or simultaneously. Further, in some exemplary embodiments, some of the operations may be omitted, added, modified, skipped, or the like without departing from the scope of the invention. In certain embodiments, one or more steps or operations of routine 500 may be successive or sequential to one or more steps or operations of routine 300 (as shown in FIG. 3) and/or routine 400 (as shown in FIG. 4) and/or may comprise one or more sub-steps or sub-operations of the foregoing routines. In accordance with certain aspects of the present disclosure, routine 500 may comprise one or more steps or operations 502-510 for configuring and deploying an interactive voice response (IVR) model at an IVR server (e.g., IVR server 110 of FIG. 1).

In accordance with certain aspects of the present disclosure, routine 500 may comprise one or more steps or operations for configuring a conversational AI model according to at least one application protocol (Step 502). The conversational AI model may comprise a generative AI model configured to learn patterns and structure of input training data to generate conversational, multi-turn interaction sequences with an end user. The conversational AI model may comprise an artificial intelligence processing framework configured to enable general-purpose language generation and other natural language processing tasks such as classification. Routine 500 may comprise one or more steps or operations for configuring (e.g., via conversational AI engine 208 of FIG. 2) a first set of conversational prompts for the conversational AI model according to a first state of the application protocol (Step 504). The first state of the application protocol may comprise a first phase in a multi-phase protocol. Routine 500 may further comprise one or more steps or operations for communicating the first set of conversational prompts to an IVR server (e.g., IVR server 110 of FIG. 1) via an application programming interface (e.g., API 108 of FIG. 1) (Step 506). The first set of conversational prompts may comprise a plurality of prompt engineering operations embodied in a computer-readable format. In certain embodiments, step 506 may comprise one or more steps or operations for configuring a data transfer interface (e.g., RESTful API) through which the IVR server may transfer telephone voice data to the application server to be processed at the conversational AI engine, wherein conversational responses and prompts may be returned to the IVR server to drive one or more natural language interaction sequences of an IVR agent (e.g., IVR agent 114 of FIG. 1). In accordance with certain embodiments, routine 500 may comprise one or more steps or operations for configuring an IVR model (e.g., via IVR module 206 of FIG. 2) according to the conversational prompts (Step 508) and deploying the IVR model at the IVR server (Step 510). In accordance with certain aspects of the present disclosure, Step 510 comprises one or more steps for configuring a plurality of operations for the IVR agent including, for example, configuring a dynamic, multi-turn call script for the IVR agent.

Figure 6:
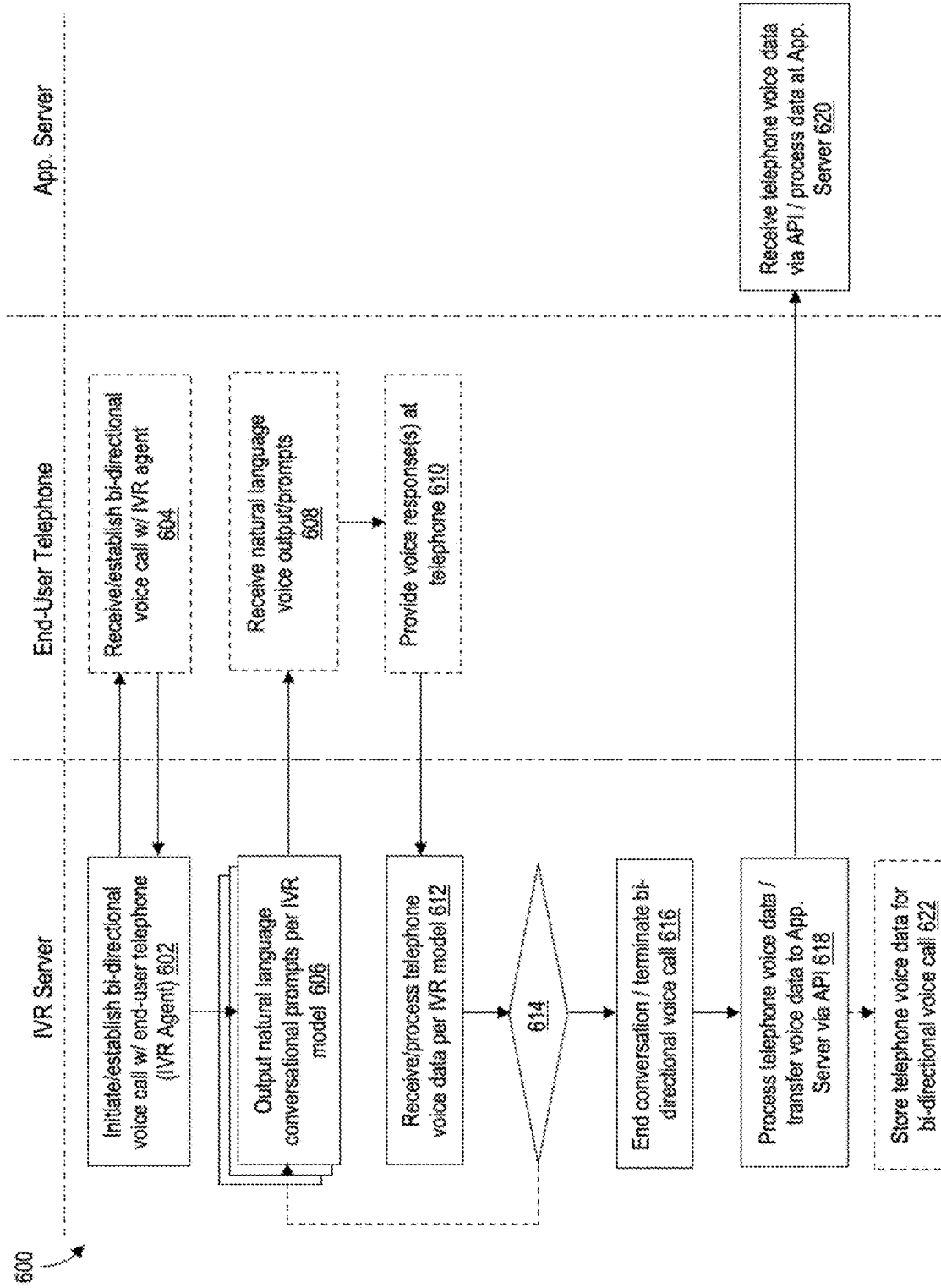
FIG. 6 is a functional block diagram of a routine for the interactive voice response system, in accordance with certain aspects of the present disclosure.

Referring now to FIG. 6, a functional block diagram of a routine 600 of an interactive voice response system (e.g., system 100 as shown in FIG. 1) is shown. The operations in routine 600 may be performed in the order presented, in a different order, or simultaneously. Further, in some exemplary embodiments, some of the operations may be omitted, added, modified, skipped, or the like without departing from the scope of the invention. In certain embodiments, one or more steps or operations of routine 600 may be successive or sequential to one or more steps or operations of routine 300 (as shown in FIG. 3) and/or routine 400 (as shown in FIG. 4) and/or routine 500 (as shown in FIG. 5) and/or may comprise one or more sub-steps or sub-operations of the foregoing routines. In accordance with certain aspects of the present disclosure, routine 600 comprises one or more of operations 602-622 for sending telephone voice data between an IVR server (e.g., IVR server 110 of FIG. 1) and an application server (e.g., application server 102 of FIG. 1). In accordance with certain aspects of the present disclosure, one or more operations of routine 600 may be executed at one or more of an end user telephone (e.g., telephone 120 of FIG. 1), an application server (e.g., application server 104 of FIG. 1), and an IVR server (e.g., IVR server 110 of FIG. 1).

In accordance with certain aspects of the present disclosure, routine 600 may comprise one or more steps or operations for initiating/establishing (e.g., via an IVR agent) a bi-directional voice call between the IVR server and a telephone associated with an end user of an end user application via a telephony network (Step 602). In accordance with certain aspects of the present disclosure, the bi-directional voice call is established at a receiver of the end user's telephone (Step 604). Upon establishing the bi-directional voice call between the IVR server and the end user's telephone, routine 600 may proceed by executing one or more steps or operations for outputting (e.g., via the IVR agent) one or more natural language conversational prompts in accordance with an IVR model as configured on the IVR server (Step 606). The natural language conversational prompts are formatted as a simulated human voice via the IVR agent. The one or more natural language conversational prompts are received/outputted at the receiver of the end user's telephone (Step 608) and one or more voice responses (i.e., voice utterances) are provided by the end user in response to the one or more natural language conversational prompts at the receiver of the end user's telephone (Step 610). In accordance with certain aspects of the present disclosure, routine 600 may proceed by executing one or more steps or operations for receiving the one or more voice responses provided by the end user and processing the one or more voice responses according to the IVR model (Step 612). Routine 600 may comprise one or more decision steps according to the IVR model to determine whether a conversational sequence with the end user is complete (Step 614). If the conversational sequence is not complete (i.e., responses to all prompts have not been received and/or all prompts have not been outputted), then routine 600 may proceed to Step 606 until the conversational sequence is complete. If the conversational sequence is complete (i.e., responses to all prompts have been received), then routine 600 may proceed by executing one or more steps or operations for ending the conversational interaction with the end user and terminating the bi-directional voice call (Step 616). In accordance with certain aspects of the present disclosure, routine 600 may proceed by executing one or more steps or operations for processing the telephone voice data (e.g., according to an NLP framework) and, optionally, formatting the telephone voice data into at least one data format (e.g., via a speech-to-text engine) and transferring the telephone voice data to the application server via at least one API (Step 618). Routine 600 may further comprise one or more steps or operations for receiving the telephone voice data at the application server (e.g., via the API) and processing the telephone voice data according to one or more data processing operations at the application server (Step 620). In certain embodiments, routine 600 may comprise one or more steps or operations for storing the telephone voice data from the bi-directional voice call with the end user (e.g., call transcript data) at a database of the IVR server (Step 622).

Figure 7:
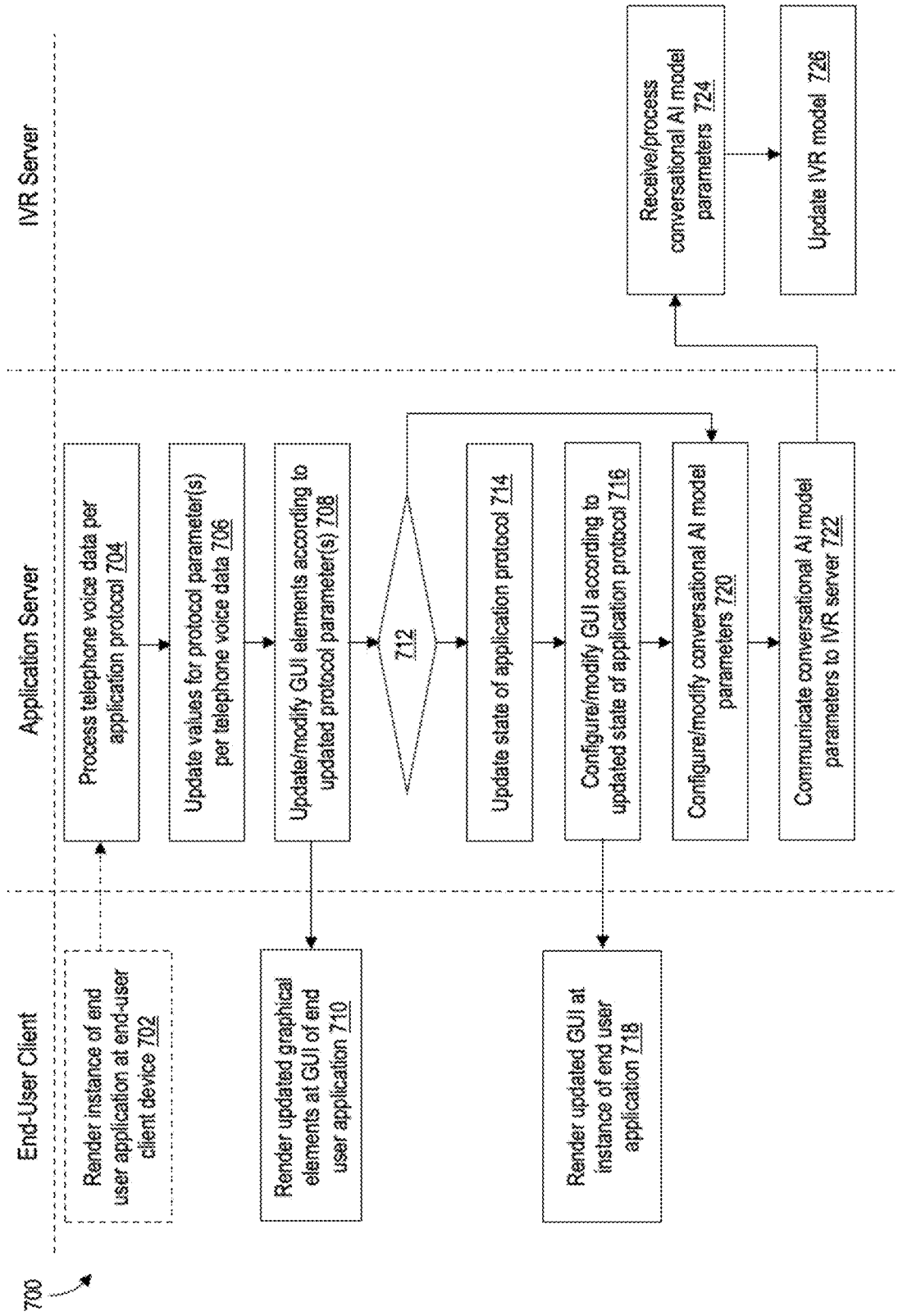
FIG. 7 is a functional block diagram of a routine for the interactive voice response system, in accordance with certain aspects of the present disclosure.

Referring now to FIG. 7, a functional block diagram of a routine 700 for an interactive voice response system (e.g., system 100 as shown in FIG. 1) is shown. The operations in routine 700 may be performed in the order presented, in a different order, or simultaneously. Further, in some exemplary embodiments, some of the operations may be omitted, added, modified, skipped, or the like without departing from the scope of the invention. In certain embodiments, one or more steps or operations of routine 700 may be successive or sequential to one or more steps or operations of routine 300 (as shown in FIG. 3) and/or routine 400 (as shown in FIG. 4) and/or routine 500 (as shown in FIG. 5) and/or routine 600 (as shown in FIG. 6) and/or may comprise one or more sub-steps or sub-operations of the foregoing routines. In accordance with certain aspects of the present disclosure, routine 700 comprises one or more operations 702-726 for configuring or modifying a graphical user interface of an end user application according to telephone voice data received outside of a session of the end user application. In certain embodiments, the end user application may comprise end user instance 104" of software application 104 as shown and described in FIG. 1.

In accordance with certain aspects of the present disclosure, one or more operations of routine 700 may be executed at one or more of an end user client (e.g., end user client 122 of FIG. 1), an application server (e.g., application server 104 of FIG. 1), and an IVR server (e.g., IVR server 110 of FIG. 1). In accordance with certain aspects of the present disclosure, routine 700 may comprise one or more steps or operations for rendering an instance of an end user application at a display of an end user client device (Step 702). In accordance with certain aspects of the present disclosure, the instance of the end user application comprises a graphical user interface comprising a plurality of graphical elements that are configured according to one or more parameters of an application protocol. In certain embodiments, the graphical user interface may comprise an initial configuration according to a first phase or state of the application protocol. In certain embodiments, the graphical user interface may be configured to provide one or more graphical representations/visualizations of one or more tasks or interaction sequences for the end user to complete according to the application protocol. In accordance with certain aspects of the present disclosure, routine 700 may comprise one or more steps or operations for processing telephone voice data for the end user (e.g., as received in accordance with routine 600) according to the application protocol (Step 704). In certain embodiments, Step 704 may comprise one or more steps or operations for extracting one or more variables from the telephone voice data according to the one or more parameters of the application protocol. Routine 700 may comprise one or more steps or operations for updating (e.g., at the application server) one or more stored values for the one or more parameters of the application protocol according to the one or more variables extracted from the telephone voice data (Step 706). Routine 700 may proceed by executing one or more steps or operations for updating and/or modifying one or more elements of the GUI for the end user application according to the updated values for the one or more parameters (Step 708). Routine 700 may comprise one or more steps or operations for rendering the one or more updated or modified graphical elements of the GUI at the instance of the end user application (Step 710). In certain embodiments, the one or more updated or modified graphical elements may comprise a graphical indication of a degree of progress or completion of the one or more tasks or interaction sequences associated with the application protocol. Routine 700 may comprise one or more steps or operations for determining whether a threshold or boundary condition has been met to update a state of the application protocol (Step 712). The state of the application protocol may comprise a one or more phase, wherein each phase comprises one or more discrete tasks or interaction sequences for the end user. In certain embodiments, the application protocol may comprise one or more discrete phases comprising one or more thresholds or boundary conditions configured to determine whether a phase has been completed and/or whether another phase should be invoked for other reasons, such as safety, compliance, best practices, etc. If an output of Step 712 determines that the threshold or boundary condition(s) has not been met, then routine 700 may proceed to Step 720, as described in more detail below. If an output of Step 712 determines that the threshold or boundary condition(s) has been met, then routine 700 may proceed by executing one or more steps or operations for updating the state of the application protocol at the application server (Step 714). Routine 700 may further comprise one or more steps or operations for configuring or modifying the GUI at the instance of the end user application (Step 716). In certain embodiments, Steps 714-718 may comprise configuring a new set of tasks and/or interaction sequences for the end user to complete via the instance of the end user application. In accordance with certain aspects of the present disclosure, routine 700 may proceed by configuring or modifying one or more parameters of the conversational AI model (e.g., as described in association with FIG. 2) according to an output of one or more of steps 704-716 (Step 720). Step 720 may comprise one or more steps or operations for modifying one or more conversational prompts and/or prompt engineering parameters of the conversational AI model. Routine 700 may comprise one or more steps or operations for communicating (e.g., via the API) the one or more updated/configured parameters of the conversational AI model to the IVR server via at least one data transfer protocol (i.e., API 108 of FIG. 1) (Step 722). Routine 700 may proceed by executing one or more steps or operations (e.g., at the IVR server) for receiving and processing the conversation AI model parameters (Step 724) and, optionally, updating the IVR model at the IVR server (Step 726). In accordance with certain aspects of the present disclosure, the IVR server is configured to execute one or more subsequent bi-directional voice call (e.g., via an IVR agent) according to the updated IVR model.

Figure 8:
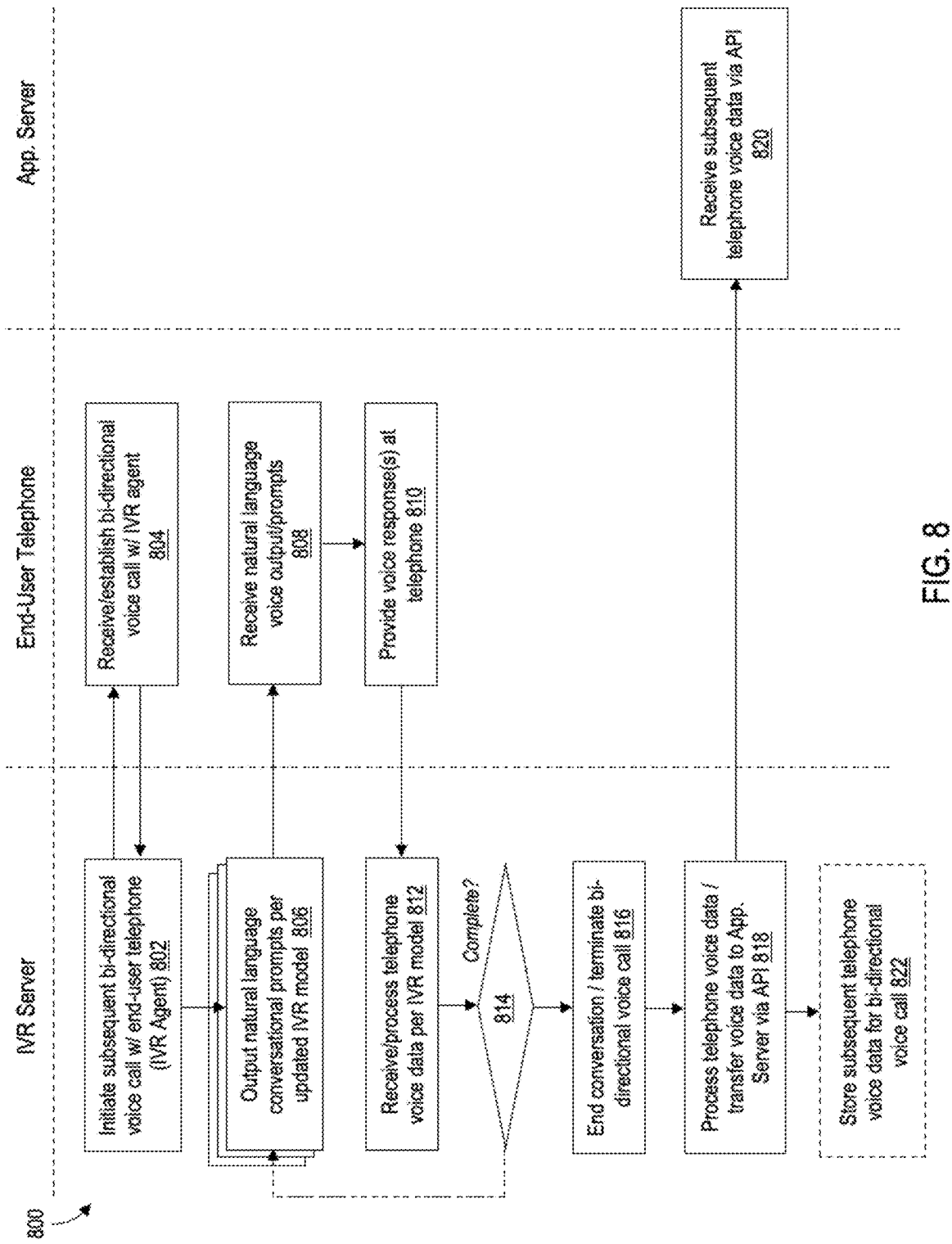
FIG. 8 is a functional block diagram of a routine for the interactive voice response system, in accordance with certain aspects of the present disclosure.

Referring now to FIG. 8, a functional block diagram of a routine 800 for an interactive voice response system (e.g., system 100 as shown in FIG. 1) is shown. The operations in routine 800 may be performed in the order presented, in a different order, or simultaneously. Further, in some exemplary embodiments, some of the operations may be omitted, added, modified, skipped, or the like without departing from the scope of the invention. In certain embodiments, one or more steps or operations of routine 800 may be successive or sequential to one or more steps or operations of routine 300 (as shown in FIG. 3) and/or routine 400 (as shown in FIG. 4) and/or routine 500 (as shown in FIG. 5) and/or routine 600 (as shown in FIG. 6) and/or routine 700 (as shown in FIG. 7) and/or may comprise one or more sub-steps or sub-operations of the foregoing routines. In accordance with certain aspects of the present disclosure, routine 800 comprises one or more steps or operations 802-822 for initiating a subsequent bi-directional voice call (e.g., subsequent to routine 600 and routine 700) and providing subsequent telephone voice data to an application server. In accordance with certain aspects of the present disclosure, one or more operations of routine 800 may be executed at one or more of an end user telephone (e.g., telephone 120 of FIG. 1), an application server (e.g., application server 104 of FIG. 1), and an IVR server (e.g., IVR server 110 of FIG. 1).

In accordance with certain aspects of the present disclosure, routine 800 may comprise one or more steps or operations for initiating/establishing (e.g., via the IVR agent) a subsequent bi-directional voice call between the IVR server and the end user telephone via a telephony network (Step 802). In accordance with certain aspects of the present disclosure, the subsequent bi-directional voice call is established at the receiver of the end user's telephone (Step 804). Upon establishing the bi-directional voice call between the IVR server and the end user's telephone, routine 800 may proceed by executing one or more steps or operations for outputting (e.g., via the IVR agent) one or more natural language conversational prompts in accordance with the updated IVR model (e.g., as configured on the IVR server in accordance with an output of routine 700) (Step 806). The one or more natural language conversational prompts are received/outputted at the receiver of the end user's telephone (Step 808) and one or more voice responses are provided by the end user in response to the one or more natural language conversational prompts at the receiver of the end user's telephone (Step 810). In accordance with certain aspects of the present disclosure, routine 800 may proceed by executing one or more steps or operations for receiving the one or more voice responses provided by the end user and processing the one or more voice responses according to the IVR model (Step 812). Routine 800 may comprise one or more decision steps according to the IVR model to determine whether a conversational sequence with the end user has been completed (Step 814). If the conversational sequence is not complete (i.e., responses to all prompts have not been received and/or all prompts have not been outputted), then routine 800 may proceed to Step 808 until the conversational sequence is complete. If the conversational sequence is complete (i.e., responses to all prompts have been received), then routine 800 may proceed by executing one or more steps or operations for ending the conversational interaction with the end user and terminating the bi-directional voice call (Step 816). In accordance with certain aspects of the present disclosure, routine 800 may proceed by executing one or more steps or operations for processing the telephone voice data (e.g., according to the NLP framework) and, optionally, formatting the telephone voice data into at least one data format (e.g., via a speech-to-text engine) and transferring the telephone voice data to the application server via at least one API (Step 818). Routine 800 may further comprise one or more steps or operations for receiving the telephone voice data at the application server (e.g., via the API) and processing the telephone voice data according to one or more data processing operations at the application server (Step 820). In certain embodiments, routine 800 may comprise one or more steps or operations for storing the telephone voice data from the subsequent bi-directional voice call with the end user (e.g., call transcript data) at the database of the IVR server (Step 822).

Figure 9:
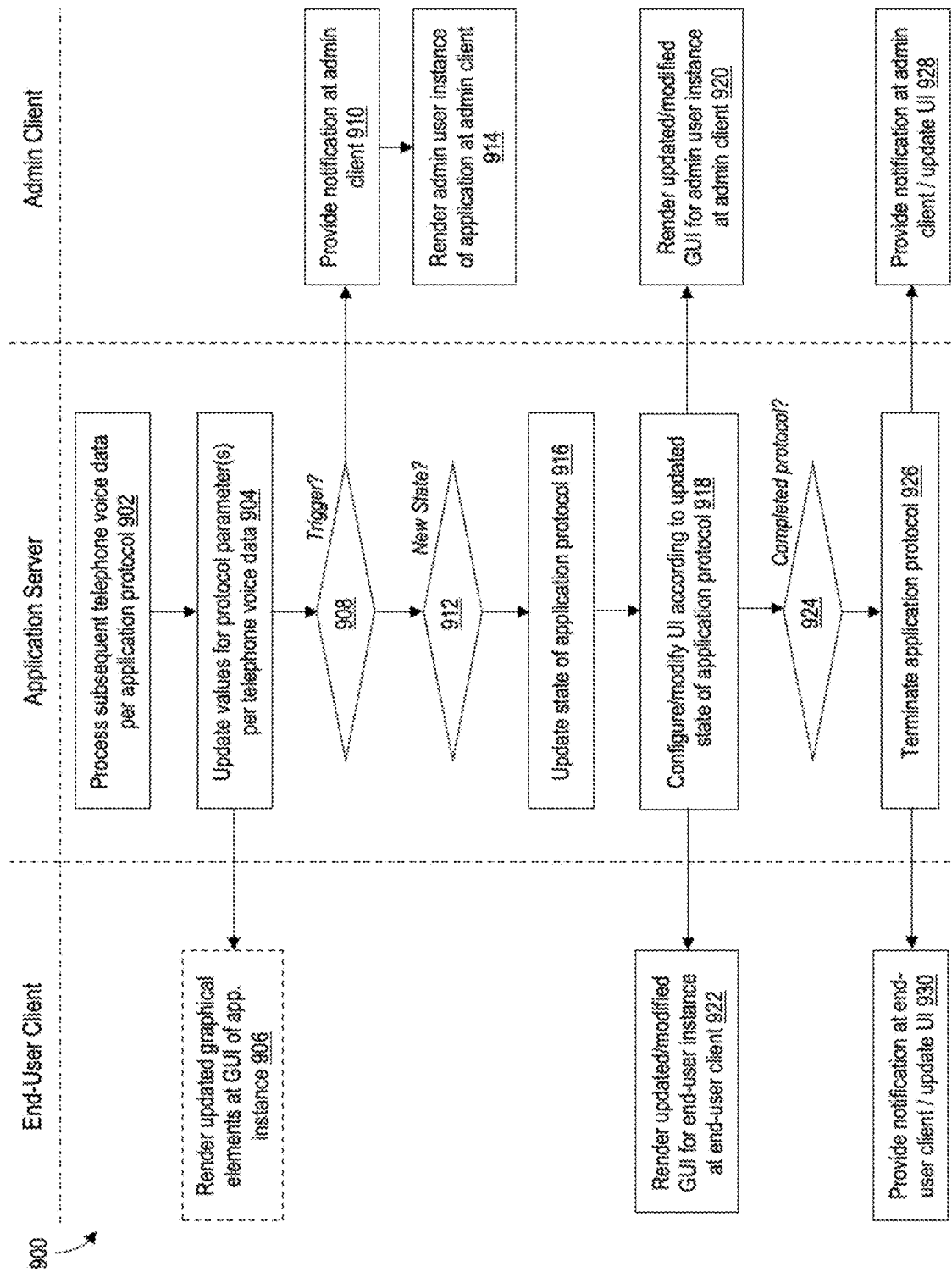
FIG. 9 is a functional block diagram of a routine for the interactive voice response system, in accordance with certain aspects of the present disclosure.

Referring now to FIG. 9, a functional block diagram of a routine 900 for an interactive voice response system (e.g., system 100 as shown in FIG. 1) is shown. The operations in routine 900 may be performed in the order presented, in a different order, or simultaneously. Further, in some exemplary embodiments, some of the operations may be omitted, added, modified, skipped, or the like without departing from the scope of the invention. In certain embodiments, one or more steps or operations of routine 900 may be successive or sequential to one or more steps or operations of routine 300 (as shown in FIG. 3) and/or routine 400 (as shown in FIG. 4) and/or routine 500 (as shown in FIG. 5) and/or routine 600 (as shown in FIG. 6) and/or routine 700 (as shown in FIG. 7) and/or routine 800 (as shown in FIG. 8) and/or may comprise one or more sub-steps or sub-operations of the foregoing routines. In accordance with certain aspects of the present disclosure, routine 900 may comprise one or more steps or operations for updating a state of an application protocol in response to telephone voice data and configuring or modifying a GUI of an end user application according to the updated state of the application protocol.

In accordance with certain aspects of the present disclosure, one or more operations of routine 900 may be executed at one or more of an end user client (e.g., end user client 122 of FIG. 1), an application server (e.g., application server 104 of FIG. 1), and an IVR server (e.g., IVR server 110 of FIG. 1). In accordance with certain aspects of the present disclosure, routine 900 may comprise one or more steps or operations for processing a subsequent telephone voice dataset (Step 902). The telephone voice dataset may comprise the subsequent telephone voice data received from the IVR server via the API as an output of routine 800 (as shown in FIG. 8). In accordance with certain embodiments, Step 902 may comprise one or more steps or operations for processing the subsequent telephone voice dataset according to a data processing framework configured to extract one or more variables from the subsequent telephone voice dataset (e.g., wherein the one or more variables correspond to one or more parameters of the application protocol). In accordance with said embodiments, routine 900 may comprise one or more steps or operations for updating one or more values for the parameters of the application protocol according to the one or more variables extracted from the subsequent telephone voice dataset (Step 904). For example, in an exemplary application protocol for medication management, the one or more variables may comprise variables such as medication dosage log data, blood glucose data, and other variables related to medication management. Step 904 may comprise one or more operations for storing the updated parameter values in the application database (e.g., application database 108 of FIG. 1). In accordance with certain embodiments, routine 900 may comprise one or more steps or operations (e.g., operations of an application engine executing on the application server) for updating or modifying one or more graphical elements of software application (e.g., software application 104 of FIG. 1) and rendering the one or more updated or modified graphical elements at a GUI of an end user instance (e.g., end user instance 104" of FIG. 1) of the software application at an end user client device (e.g., end user client 122 of FIG. 1). In accordance with certain aspects of the present disclosure, routine 900 may proceed by executing one or more steps or operations for processing the updated parameter values to determine whether at least one trigger value or threshold value has been obtained for the application protocol (Step 908). For example, in an exemplary application protocol for medication management, the at least one trigger value or threshold value may comprise a safety trigger (e.g., such as a maximum blood glucose reading) or a protocol threshold (e.g., such as completion of a required lab test). In certain embodiments, if the updated parameter values meet or exceed a trigger or threshold value, routine 900 may comprise one or more steps or operations for providing a notification or other communication to an admin client (e.g., admin client 124 of FIG. 1) via a network communications interface (e.g., network interface 116 of FIG. 1) (Step 910). In accordance with certain embodiments, the notification or other communication may be rendered at a GUI of an admin user instance (e.g., admin instance 104' of FIG. 1) (Step 914). Routine 900 may proceed by executing one or more steps or operations for processing the updated parameter values to determine whether a new state of the application protocol is invoked in accordance with a multi-phase or multi-state application protocol (Step 912). For example, in an exemplary application protocol for a medication management application, a first phase of the application protocol may include a first dosage amount and frequency of a drug for a patient and a second phase of the application protocol may include a second dosage amount and frequency of the drug for the patient. In accordance with certain aspects of the present disclosure, if an output of Step 912 indicates that a new state of the application protocol has been reached, routine 900 may proceed by executing one or more steps or operations for updating the state of the application protocol at the application server (Step 916). In certain embodiments, Step 916 may comprise one or more steps for updating one or more parameters of the application protocol according to the updated state. Routine 900 may further comprise one or more steps or operations for configuring or modifying one or more aspects of the graphical user interface of the software application according to the updated state of the application protocol (Step 918). Step 918 may comprise one or more steps or operations for updating or configuring one or more tasks or interaction sequences for the software application according to the updated state of the application protocol. In certain embodiments, routine 900 may comprise one or more steps or operations for rendering an updated and/or modified GUI for the admin user instance of the software application at the admin client device (Step 920) and/or one or more steps or operations for rendering an updated and/or modified GUI for the end user instance of the software application at the end user client device (Step 922). In certain embodiments, Step 920 and/or Step 922 comprise presenting one or more updated task or interaction sequence for the admin user and/or the end user of the software application. In accordance with certain aspects of the present disclosure, routine 900 may comprise one or more steps or operations for determining whether a completion threshold for the application protocol has been met based on the one or more variables extracted from the subsequent telephone voice dataset (Step 924). For example, in an exemplary application protocol for a medication management application, a completion threshold for the application protocol may comprise a total number of days on a prescribed drug regimen. In accordance with certain embodiments, if an output of Step 924 determines that the completion threshold for the application protocol has been met, routine 900 may comprise one or more steps or operations for terminating the application protocol for the software application (Step 926). In certain embodiments, an output of Step 926 may comprise one or more steps or operations for terminating the one or more tasks or interactions sequences for the software application. In certain embodiments, Step 926 may comprise one or more steps or operations for modifying one or more user interface elements for the software application in response to terminating the application protocol. In certain embodiments, routine 900 may comprise one or more steps or operations for providing a notification at the end user client in response to terminating the application protocol (e.g., to notify the end user that the application protocol has been terminated/completed) and one or more steps or operations for updating or modifying one or more elements of the GUI at the end user instance of the software application (Step 930). In certain embodiments, routine 900 may comprise one or more steps or operations for providing a notification at the admin user client in response to terminating the application protocol (e.g., to notify the admin user that the application protocol has been terminated/completed) and one or more steps or operations for updating or modifying one or more elements of the GUI at the admin user instance of the software application (Step 928).

Figure 10:
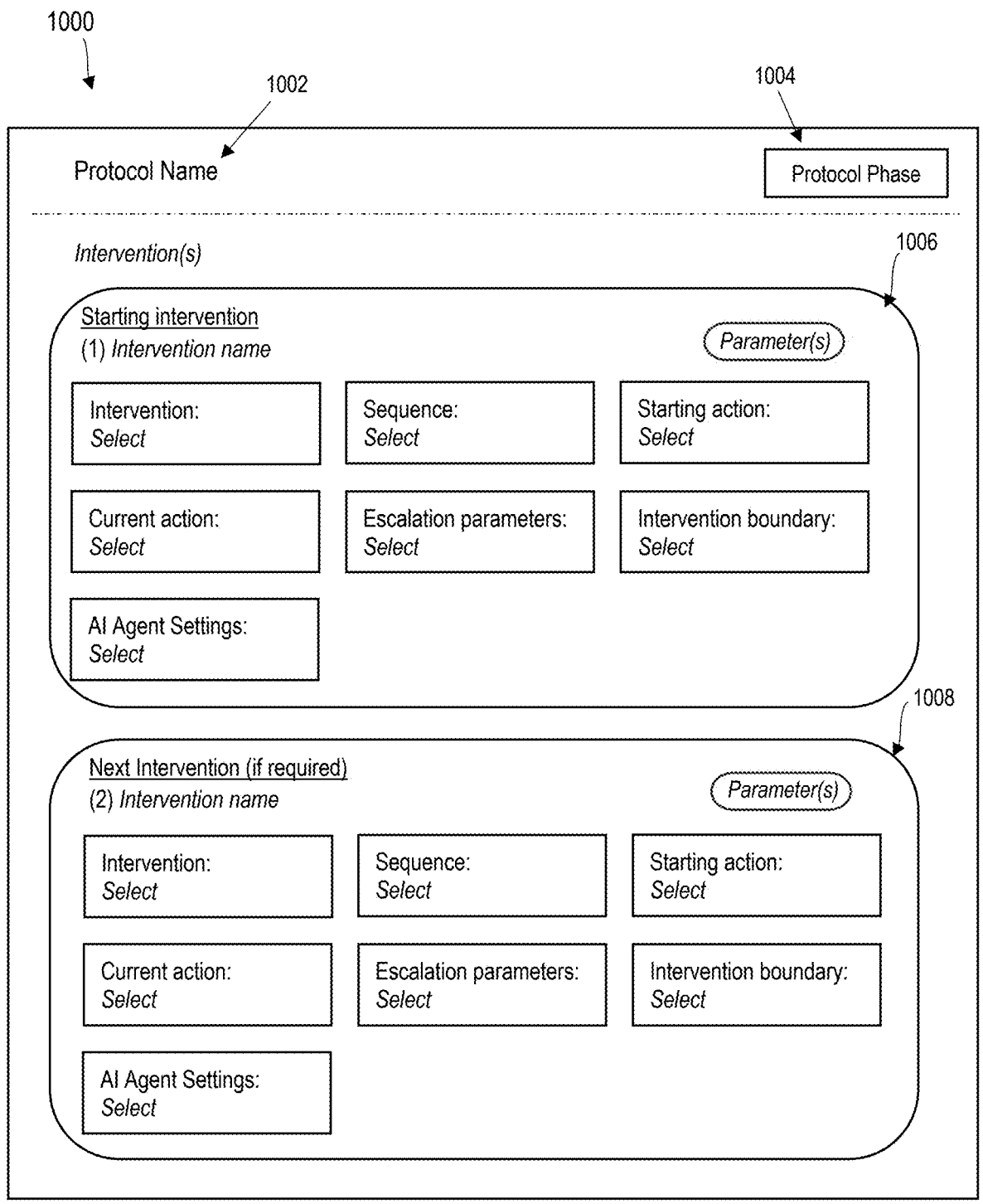
FIG. 10 is an illustration of a graphical user interface screen for configuring an application protocol in association with the interactive voice response system.

Referring now to FIG. 10, an illustration of a graphical user interface screen 1000 for configuring an application protocol in association with the interactive voice response system (e.g., system 100 of FIG. 1) is shown. In accordance with certain embodiments, graphical user interface screen 1000 is presented at an admin user instance (e.g., admin user instance 104' of FIG. 1) of a software application (e.g., software application 104 of FIG. 1). In accordance with certain aspects of the present disclosure, graphical user interface screen 1000 comprises a plurality of graphical elements configured to enable the admin user to configure one or more interventions associated with one or more remote intervention protocol. In accordance with certain embodiments, the admin user instance (e.g., admin user instance 104' of FIG. 1) is configured to provide one or more natural language prompts to the admin user, wherein the one or more natural language prompts are associated with the same data fields as contained in graphical user interface screen 1000. In said embodiments, the admin user instance is configured to configure the one or more remote intervention protocol based on one or more voice inputs received from the admin user. In an illustrative use case, a remote intervention protocol may comprise a medication management protocol for the treatment or management of one or more diseases or medical condition; for example, a medication regimen for management of Type 2 diabetes. In certain embodiments, graphical user interface screen 1000 may comprise a first graphical element 1002 for configuring and/or displaying a protocol name associated with a specific protocol. Graphical user interface screen 1000 may further comprise a second graphical element 1004 for configuring and/or displaying a protocol phase associated with the protocol. In accordance with certain embodiments, graphical user interface screen 1000 may comprise a first plurality of interface elements 1006 configured to configure and/or display a plurality of parameters associated with a first intervention plan for the end user. In certain embodiments, graphical user interface screen 1000 may comprise a second (or subsequent) plurality of interface elements 1008 configured to configure and/or display a plurality of parameters associated with a second intervention plan for the end user. In accordance with certain embodiments, the second intervention plan may be conditional on one or more parameters for the first intervention plan. In accordance with certain aspects of the present disclosure, the interactive voice response system is configured to configure one or more prompts for the IVR system according to the parameters configured via first plurality of interface elements 1006 and second plurality of interface elements 1008. In certain embodiments, first plurality of interface elements 1006 and/or second plurality of interface elements 1008 may comprise one or more interface elements for configuring an intervention type; for example, a specific medication in a medication management protocol. First plurality of interface elements 1006 and/or second plurality of interface elements 1008 may further comprise one or more interface elements for configuring a sequence for one or more tasks or actions for the intervention plan; for example, a medication dosing regimen in the medication management protocol. First plurality of interface elements 1006 and/or second plurality of interface elements 1008 may further comprise one or more interface elements for configuring a starting action in the intervention plan, a current action in the intervention plan, one or more escalation parameters for the intervention plan, one or more intervention boundaries for the intervention plan, and one or more AI agent settings for the intervention plan (e.g., one or more settings for configuring one or more interaction sequences for the IVR agent). In accordance with certain aspects of the present disclosure, graphical user interface screen 1000 is configured to enable an administrator user to configure, view and manage one or more of a user intervention plan; success parameters for an intervention plan (e.g., conditions for proceeding to a subsequent plan); one or more intervention plan pathway (e.g., route(s) or workflow(s) selected by the administrator for the user to follow in executing the intervention plan); one or more boundary conditions for the intervention plan (e.g., completion parameters); one or more safety and human escalation parameters for the intervention plan (e.g., temporary stopping conditions and alert/notifications); one or more ranked priorities for the intervention plan; and/or one or more AI agent engagement settings, such as persistence, personality, flexibility, and language complexity.

Figure 11:
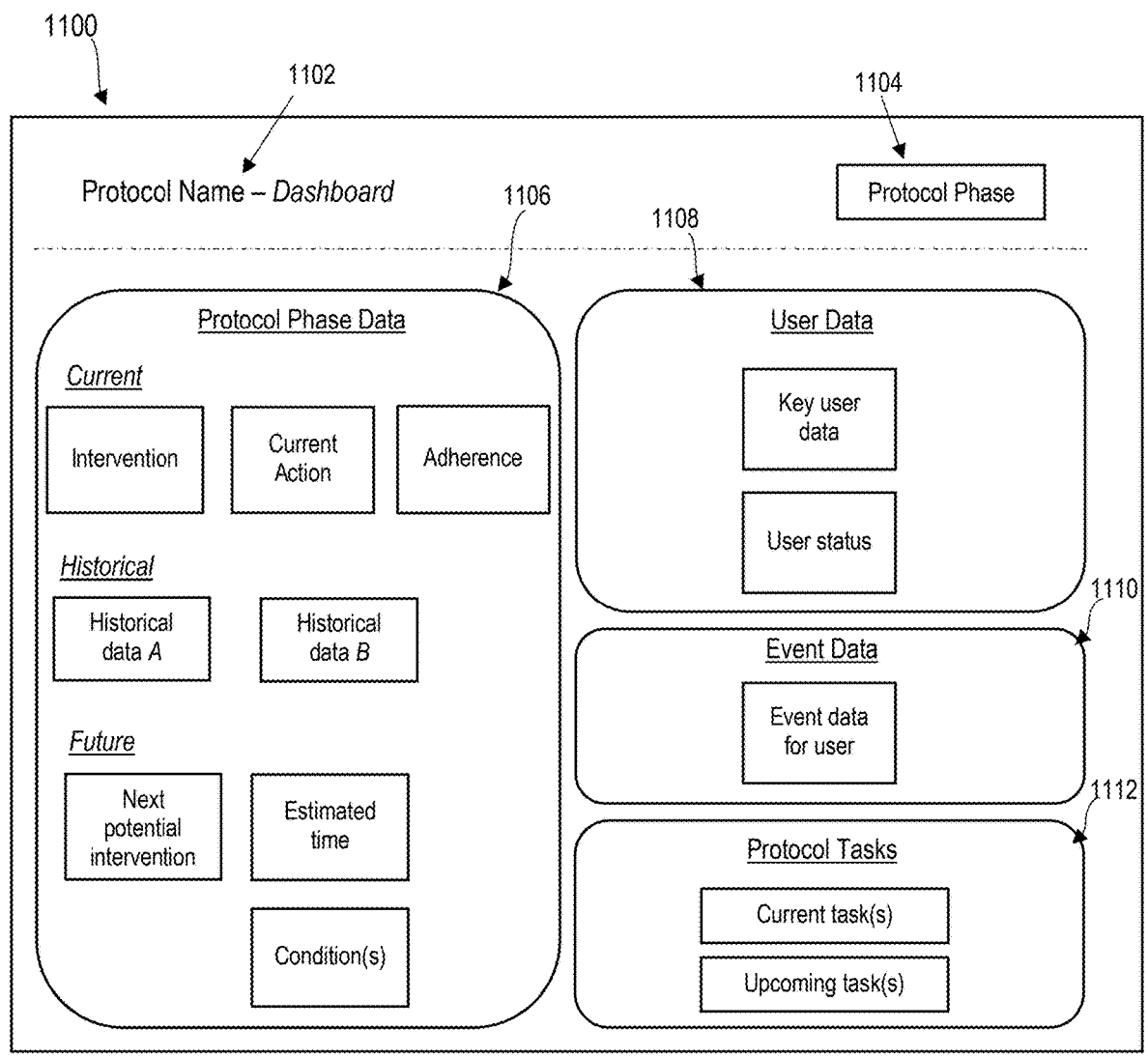
FIG. 11 is an illustration of a graphical user interface screen that may be configured according to telephone voice data received by the interactive voice response system.

FIG. 11 is an illustration of a graphical user interface screen 1100 that may be configured according to telephone voice data received by the interactive voice response system (e.g., system 100 of FIG. 1). In accordance with certain embodiments, graphical user interface screen 1100 is presented at an admin user instance (e.g., admin user instance 104' of FIG. 1) of a software application (e.g., software application 104 of FIG. 1). In accordance with certain aspects of the present disclosure, graphical user interface screen 1100 comprises a plurality of graphical elements configured to enable the admin user to view one or more real-time data and/or status associated with one or more remote intervention protocol. In accordance with certain aspects of the present disclosure, the one or more remote intervention protocol comprises at least one protocol configured according to graphical user interface screen 1000 (as shown in FIG. 10). In accordance with certain embodiments, graphical user interface screen 1100 may comprise a first graphical element 1102 configured to display the name of the selected protocol and a second graphical element 1104 configured to display the phase associated with the selected protocol. In accordance with certain embodiments, graphical user interface screen 1100 may comprise a first plurality of interface elements 1106 comprising a plurality of interface elements configured to display (e.g., in real-time) a plurality of data associated with the phase of the selected protocol. In certain embodiments, first plurality of interface elements 1106 may comprise one or more interface elements configured to display one or more current (e.g., active) data for the selected protocol; for example, a current intervention type (for example, a specific medication regimen in a disease management protocol), a current action for the protocol (for example, next dosage amount in the medication regimen), and user adherence data (for example, displayed as a percentage of user adherence to the selected protocol based on telephone voice data for the user). In certain embodiments first plurality of interface elements 1106 may further comprise one or more interface elements configured to display one or more historical (e.g., past) data for the selected protocol; for example, a number of completed interactions with the IVR agent or a number of completed tasks by the user. In certain embodiments first plurality of interface elements 1106 may further comprise one or more interface elements configured to display one or more future parameters for the selected protocol; for example, identification of a next potential intervention, an estimated time until the next potential intervention, and one or more conditions for the next potential intervention.

In accordance with certain aspects of the present disclosure, graphical user interface screen 1100 may comprise a second plurality of interface elements 1108 comprising a plurality of interface elements configured to display (e.g., in real-time) a plurality of user data, such as user activity data or user response data (e.g., in response to one or more user interactions with the IVR agent). In certain embodiments, second plurality of interface elements 1108 may comprise one or more interface elements configured to display key data for the end user (i.e., one or more key metric for the selected protocol). For example, in a protocol for management of Type 2 diabetes, key data for the end user may comprise average fasting blood glucose data. In certain embodiments, second plurality of interface elements 1108 may comprise one or more interface elements configured to display a status indicator for the end user. For example, the status indicator may comprise a status determined according to a desired end state or adherence condition. In certain embodiments, the end user status may be expressed according to one or more subjective indicators, such as "off-track," "on-track," or "at-risk." In accordance with certain aspects of the present disclosure, graphical user interface screen 1100 may comprise a third plurality of interface elements 1110 comprising a plurality of interface elements configured to display (e.g., in real-time) a plurality of event data for the end user. In certain embodiments, the plurality of event data may comprise data for one or more past or upcoming task for the end user; for example, in a protocol for disease management, the event data may comprise laboratory testing data for the end user. In accordance with certain aspects of the present disclosure, graphical user interface screen 1100 may comprise a fourth plurality of interface elements 1112 comprising a plurality of interface elements configured to display one or more current task for the end user and/or one or more upcoming task for the end user. For example, in a protocol for disease management, a current task might include a task to provide medication adherence data for a current period to the IVR agent, and an upcoming task may include one or more scheduled lab test or provider appointment.

In accordance with certain aspects of the present disclosure, graphical user interface screen 1100 may comprise a plurality of dynamic user interface elements configured to provide one or more real-time data and status updates for a remote intervention for an end user. In certain embodiments, graphical user interface screen 1100 may comprise one or more graphical elements for displaying one or more user engagement metric for the end user; one or more status indicators for task completion; one or more performance indicators for the user in completing one or more tasks; one or more current active user protocols; one or more current locked protocols; one or more next potential action in an active user protocol; one or more summary of key events; and/or one or more important follow-up tasks for an administrator user and/or and end user (e.g., optionally, with hyperlinks or shortcuts to execute the relevant tasks). In accordance with certain aspects of the present disclosure, one or more elements of graphical user interface screen 1100 may be updated and rendering in real-time in response to one or more telephone voice interactions between the end user and the IVR agent.

Figure 12:
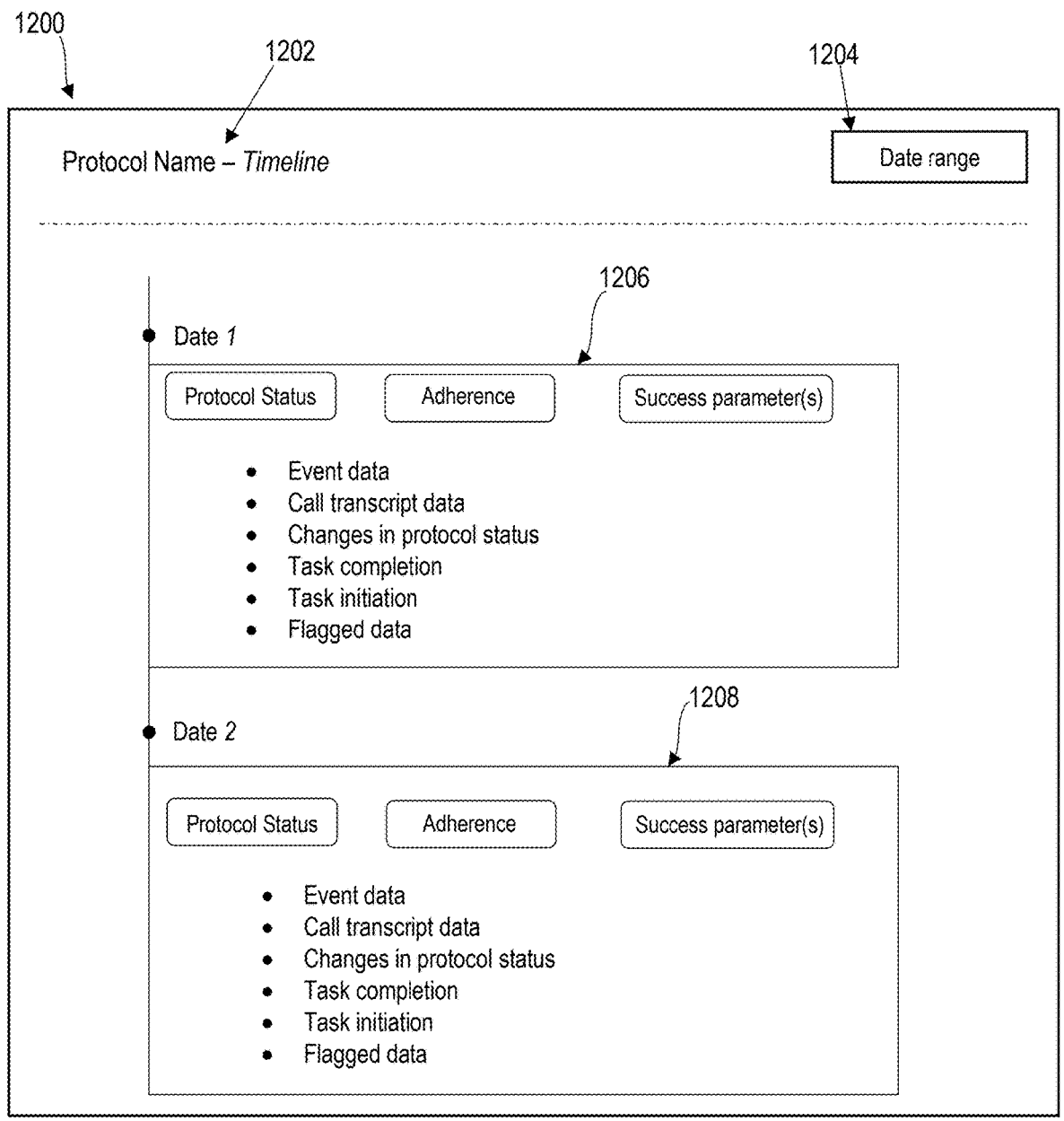
FIG. 12 is an illustration of a graphical user interface screen that may be configured according to telephone voice data received by the interactive voice response system.

FIG. 12 is an illustration of a graphical user interface screen 1200 that may be configured according to telephone voice data received by the interactive voice response system (e.g., system 100 of FIG. 1). In accordance with certain embodiments, graphical user interface screen 1200 is presented at an admin user instance (e.g., admin user instance 104' of FIG. 1) of a software application (e.g., software application 104 of FIG. 1). In accordance with certain aspects of the present disclosure, graphical user interface screen 1200 comprises a plurality of graphical elements configured to enable the admin user to view a timeline of event data for one or more remote intervention protocol and/or AI-generated call notes for one or more voice interaction between an end user and an IVR agent. In accordance with certain aspects of the present disclosure, the one or more remote intervention protocol comprises at least one protocol configured according to graphical user interface screen 1000 (as shown in FIG. 10). In accordance with certain embodiments, graphical user interface screen 1200 may comprise a first graphical element 1202 configured to display the name of the selected protocol and a second graphical element 1204 configured to display/select a date range for the timeline. In accordance with certain embodiments, graphical user interface screen 1200 may comprise a first plurality of interface elements 1206 associated with a first date in the selected date range. In certain embodiments, first plurality of interface elements 1206 may comprise one or more elements for displaying a protocol status for the selected date, adherence data for the end user (e.g., optionally, expressed as a percentage), and one or more success parameters for the end user for the first date. In certain embodiments, first plurality of interface elements 1206 may comprise one or more elements for displaying event data for the end user; AI-generated call transcript data (e.g., based on one or more telephone voice interactions between the end user and the IVR agent); one or more changes in protocol status; task completion data; task initiation data; and, optionally, one or more flagged data item (e.g., according to one or more parameters for the selected protocol). In accordance with certain aspects of the present disclosure, graphical user interface screen 1200 may comprise a second (or subsequent) plurality of interface elements 1208 associated with a second (or subsequent) date in the selected date range. In accordance with certain aspects of the present disclosure, second plurality of interface elements 1208 comprise the same categories and types of user interface elements as those of first plurality of interface elements 1206.

In accordance with certain aspects of the present disclosure, graphical user interface screen 1200 may comprise a plurality of dynamic user interface elements configured to provide a timeline of historical data associated with a remote intervention for an end user. In certain embodiments, graphical user interface screen 1200 may comprise one or more graphical elements for displaying one or more historical events for the end user (e.g., including changes to the intervention protocol); one or more IVR agent call transcripts (e.g., for one or more telephone voice calls between the end user and the IVR agent); one or more AI-generated call notes based on the one or more IVR agent call transcripts; one or more changes in protocol status; historical data related to one or more success parameters; historical data related to user engagement; task completion data; task initiation data; flagged user-reported data; and/or flagged AI agent interventions. In accordance with certain aspects of the present disclosure, one or more elements of graphical user interface screen 1200 may be updated and rendered in real-time in response to one or more telephone voice interactions between the end user and the IVR agent.

Figure 13:
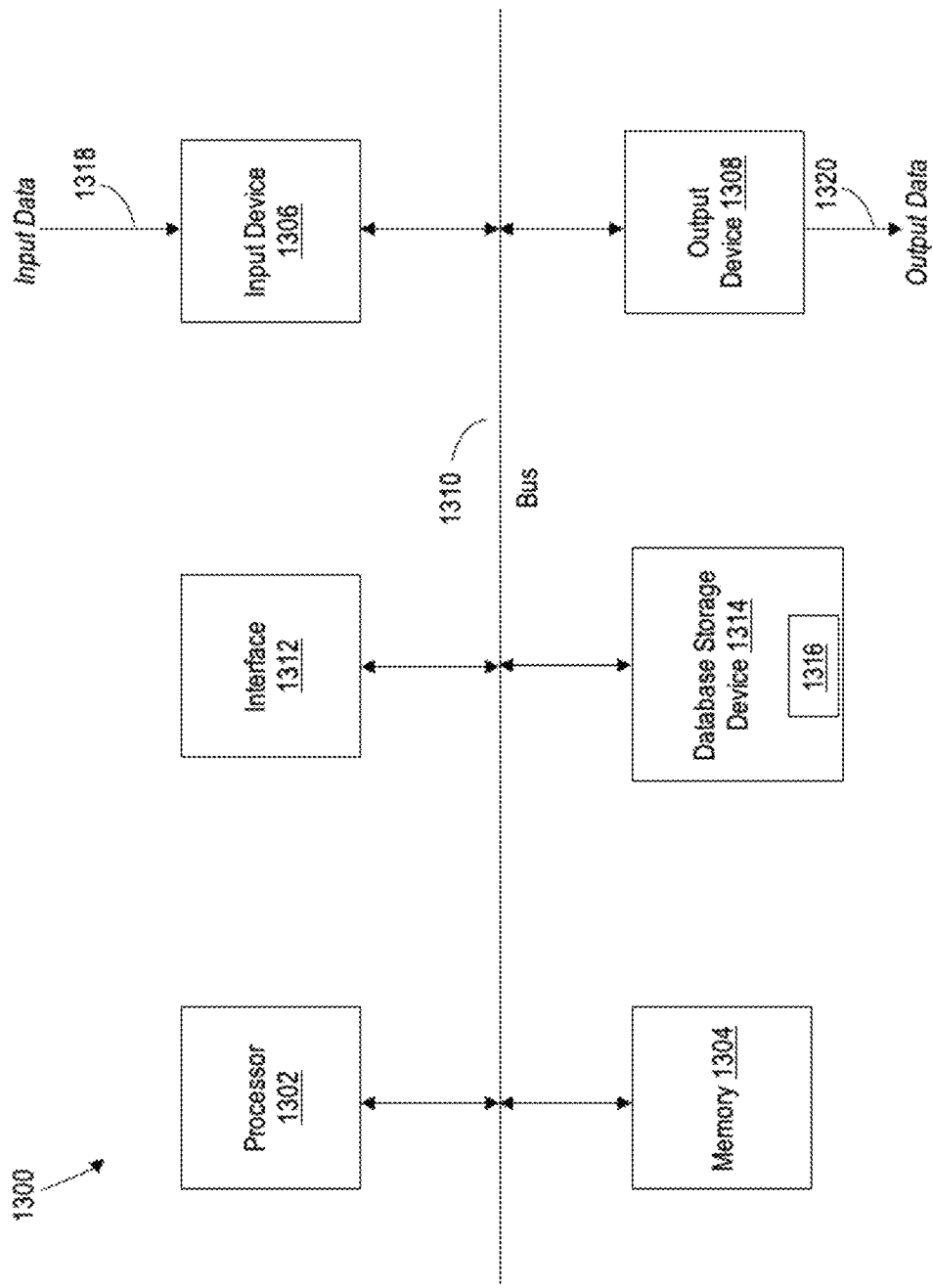
FIG. 13 is an illustrative embodiment of a computing device through which one or more aspects of the present disclosure may be implemented.

Referring now to FIG. 13, a processor-implemented computing device in which one or more aspects of the present disclosure may be implemented is shown. According to an embodiment, a processing system 1300 may generally comprise at least one processor 1302, or processing unit or plurality of processors, memory 1304, at least one input device 1306 and at least one output device 1308, coupled together via a bus or group of buses 1310. In certain embodiments, input device 1306 and output device 1308 could be the same device. An interface 1312 can also be provided for coupling the processing system 1300 to one or more peripheral devices, for example interface 1312 could be a PCI card or PC card. At least one storage device 1314 which houses at least one database 1316 can also be provided. The memory 1304 can be any form of memory device, for example, volatile or non-volatile memory, solid state storage devices, magnetic devices, etc. The processor 1302 could comprise more than one distinct processing device, for example to handle different functions within the processing system 1300. Input device 1306 receives input data 1318 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 1318 could come from different sources, for example keyboard instructions in conjunction with data received via a network. Output device 1308 produces or generates output data 1320 and can comprise, for example, a display device or monitor in which case output data 1320 is visual, a printer in which case output data 1320 is printed, a port for example a USB port, a peripheral component adaptor, a data transmitter or antenna such as a modem or wireless network adaptor, etc. Output data 1320 could be distinct and derived from different output devices, for example a visual display on a monitor in conjunction with data transmitted to a network. A user could view data output, or an interpretation of the data output, on, for example, a monitor or using a printer. The storage device 1314 can be any form of data or information storage means, for example, volatile or non-volatile memory, solid state storage devices, magnetic devices, etc.

In use, the processing system 1300 is adapted to allow data or information to be stored in and/or retrieved from, via wired or wireless communication means, at least one database 1316. The interface 1312 may allow wired and/or wireless communication between the processing unit 1302 and peripheral components that may serve a specialized purpose. In general, the processor 1302 can receive instructions as input data 1318 via input device 1306 and can display processed results or other output to a user by utilizing output device 1308. More than one input device 1306 and/or output device 1308 can be provided. It should be appreciated that the processing system 1300 may be any form of terminal, server, specialized hardware, or the like.

It is to be appreciated that the processing system 1300 may be a part of a networked communications system. Processing system 1300 could connect to a network, for example the Internet or a WAN. Input data 1318 and output data 1320 could be communicated to other devices via the network. The transfer of information and/or data over the network can be achieved using wired communications means or wireless communications means. A server can facilitate the transfer of data between the network and one or more databases. A server and one or more databases provide an example of an information source. Thus, the processing computing system environment 1300 illustrated in FIG. 13 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 13 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 1300 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1300, or portions thereof, may be stored in a remote memory storage device. It is to be appreciated that the illustrated network connections of FIG. 13 are exemplary and other means of establishing a communications link between multiple computers may be used.

FIG. 13 is intended to provide a brief, general description of an illustrative and/or suitable exemplary environment in which embodiments of the below described present invention may be implemented. FIG. 13 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the foregoing description, certain embodiments have been described with reference to acts and symbolic representations of operations that are performed by one or more computing devices, such as the computing system environment 1300 of FIG. 13. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing telephone voice data, the system comprising:
   one or more processors; and
   at least one non-transitory computer-readable memory device in communication with the one or more processors and having processor-executable instructions stored thereon that, when executed by the one or more processors, is configured to cause the one or more processors to execute one or more operations, the one or more operations comprising:
   providing a first instance of an end user application comprising a user interface to a client device associated with a first end user, wherein the user interface comprises one or more graphical elements configured according to one or more parameters of an application protocol for the end user application, wherein the end user application is a patient medication regimen, and
   wherein the application protocol comprises one or more task or interaction sequence for the first end user;
   establishing, via a telephony network, a bi-directional voice call between an interactive voice response agent and the client device;
   generating, via the interactive voice response agent, at least one conversational prompt comprising a natural language audio output over the bi-directional voice call,
   wherein the at least one conversational prompt is configured according to the one or more task or interaction sequence for the first end user;
   receiving, via the bi-directional voice call, at least one voice utterance from the first end user in response to the at least one conversational prompt, wherein the at least one voice utterance is received via a receiver of the client device;
   processing the at least one voice utterance according to a natural language processing engine to generate at least one dataset comprising the telephone voice data;
   processing the telephone voice data to extract one or more variables associated with the one or more parameters of the application protocol;
   updating a state of the application protocol according to the one or more variables extracted from the telephone voice data,
   wherein updating the state of the application protocol comprises updating the one or more task or interaction sequence for the first end user; and
   modifying the one or more graphical elements of the user interface in response to updating the state of the application protocol.

2. The system of claim 1 wherein the one or more parameters of the application protocol are configured according to one or more user-generated inputs.

3. The system of claim 1 wherein the one or more graphical elements are modified according to the one or more variables extracted from the telephone voice data.

4. The system of claim 1 wherein the one or more graphical elements are configured to provide a graphical visualization of one or more steps or operations of the application protocol.

5. The system of claim 1 wherein the one or more graphical elements are modified to display a stage or degree of progress for the one or more task or interaction sequence.

6. The system of claim 1 wherein the one or more operations further comprise establishing, via the telephony network, a subsequent bi-directional voice call between the interactive voice response agent and the client device in response to updating the state of the application protocol according to the one or more variables extracted from the telephone voice data.

7. The system of claim 6 wherein the one or more operations further comprise generating, via the interactive voice response agent, at least one subsequent conversational prompt, wherein the at least one subsequent conversational prompt is configured according to the updated state of the application protocol.

8. A system for processing telephone voice data, the system comprising:
   one or more processors; and
   at least one non-transitory computer-readable memory device in communication with the one or more processors and having processor-executable instructions stored thereon that, when executed by the one or more processors, is configured to cause the one or more processors to execute one or more operations, the one or more operations comprising:

receiving a first set of user-generated inputs from a first user, the first set of user-generated inputs comprising one or more parameters for an application protocol of an end user application, wherein the end user application is a patient medication regimen;

configuring the application protocol according to the first set of user-generated inputs, wherein the application protocol comprises one or more task or interaction sequence for a second user;

configuring at least one conversational prompt for an interactive voice response agent according to the one or more task or interaction sequence for the second user;

establishing, via a telephony network, a bi-directional voice call between the interactive voice response agent and a telephone associated with the second user;

generating, via the interactive voice response agent, a natural language audio output over the bi-directional voice call, the natural language audio output comprising the at least one conversational prompt;

receiving, via the bi-directional voice call, at least one voice utterance from the second user in response to the at least one conversational prompt;

processing the at least one voice utterance according to a natural language processing engine to generate at least one dataset comprising the telephone voice data;

processing the telephone voice data to extract one or more variables associated with the one or more parameters for the application protocol of the end user application; and updating a state of the application protocol according to the one or more variables extracted from the telephone voice data, wherein updating the state of the application protocol comprises updating the one or more task or interaction sequence for the second user.

9. The system of claim 8 wherein the one or more operations further comprise configuring a graphical user interface of the end user application according to the one or more parameters of the application protocol.

10. The system of claim 9 wherein the one or more operations further comprise presenting an instance of the end user application to the second user via a client device.

11. The system of claim 10 wherein the one or more operations further comprise modifying one or more graphical elements of the graphical user interface in response to updating the state of the application protocol.

12. The system of claim 11 wherein the one or more graphical elements are modified according to the one or more variables extracted from the telephone voice data.

13. The system of claim 12 wherein the one or more graphical elements are configured to provide a graphical visualization of one or more steps or operations of the application protocol.

14. The system of claim 13 wherein the one or more graphical elements are modified to provide a graphical visualization of a stage or degree of progress for the one or more task or interaction sequence.

15. A system for processing telephone voice data comprising:

one or more processors; and at least one non-transitory computer-readable memory device in communication with the one or more processors and having processor-executable instructions stored thereon that, when executed by the one or more processors, is configured to cause the one or more processors to execute one or more operations, the one or more operations comprising:

configuring an application protocol for an end user application, wherein the application protocol comprises one or more task or interaction sequence for an end user of the end user application, wherein the end user application is a patient medication regimen, and wherein the end user application comprises a graphical user interface comprising one or more graphical elements configured to provide a visualization of the one or more task or interaction sequence for the end user;

configuring at least one conversational prompt for an interactive voice response agent according to the one or more task or interaction sequence for the end user;

establishing, via a telephony network, a bi-directional voice call between the interactive voice response agent and a telephone associated with the end user;

providing, via the bi-directional voice call, the at least one conversational prompt to the end user, wherein the at least one conversational prompt comprises a natural language audio output by the interactive voice response agent;

receiving, via the bi-directional voice call, at least one voice utterance from the end user in response to the at least one conversational prompt;

processing the at least one voice utterance according to a natural language processing engine to generate at least one dataset comprising the telephone voice data;

processing the telephone voice data to extract one or more variables associated with one or more parameters of the application protocol; and configuring or modifying the one or more graphical elements of the graphical user interface according to the one or more variables extracted from the telephone voice data.

16. The system of claim 15 wherein the one or more operations further comprise updating a state of the application protocol according to the one or more variables extracted from the telephone voice data.

17. The system of claim 16 wherein updating the state of the application protocol comprises updating the one or more task or interaction sequence for the end user.

18. The system of claim 15 wherein the one or more operations further comprise providing an instance of the end user application to an end user device associated with the end user.

19. The system of claim 15 wherein the one or more graphical elements are configured or modified to provide a graphical visualization of a stage or degree of progress for the one or more task or interaction sequence.

20. The system of claim 15 wherein the one or more operations further comprise receiving a plurality of user-generated input data for configuring the application protocol for the end user application.

* * * * *